United States Patent [19]
Matsuo et al.

[11] Patent Number: 5,448,689
[45] Date of Patent: Sep. 5, 1995

[54] GRAPHIC DATA PROCESSING SYSTEM

[75] Inventors: Shigeru Matsuo, Hitachi; Koyo Katsura, Hitachiota; Jun Sato, Musashino; Takashi Sone, Tokyo; Masakatu Yokoyama, Hitachi, all of Japan

[73] Assignees: Hitachi, Ltd., Tokyo; Hitachi Engineering Co., Ltd., Hitachi, both of Japan

[21] Appl. No.: 234,772

[22] Filed: Apr. 28, 1994

Related U.S. Application Data

[60] Continuation of Ser. No. 942,001, Sep. 8, 1992, Pat. No. 5,319,750, which is a continuation of Ser. No. 544,503, Jun. 27, 1990, Pat. No. 5,202,962, which is a division of Ser. No. 175,418, Mar. 30, 1988, Pat. No. 4,965,750.

[30] Foreign Application Priority Data

| | | |
|---|---|---|
| Mar. 31, 1987 [JP] | Japan | 62-78195 |
| May 15, 1987 [JP] | Japan | 62-116870 |
| Jul. 10, 1987 [JP] | Japan | 62-171032 |

[51] Int. Cl.⁶ .......................... G06F 15/62
[52] U.S. Cl. .......................... 395/131
[58] Field of Search ............... 395/129, 131, 162, 164, 395/165, 166; 382/41; 345/153, 154, 155; 358/75, 76, 80

[56] References Cited
U.S. PATENT DOCUMENTS

| | | | |
|---|---|---|---|
| 4,549,172 | 10/1985 | Welk | 340/703 |
| 4,667,295 | 5/1987 | Preston, Jr. | 369/518 |
| 4,680,720 | 7/1987 | Yoshii et al. | 382/41 |
| 4,720,871 | 1/1988 | Chambers | 382/41 |
| 4,769,632 | 9/1988 | Work et al. | 340/701 |
| 4,965,750 | 10/1990 | Matsuo et al. | 395/166 |
| 5,319,750 | 7/1994 | Matsuo et al. | 395/166 |

OTHER PUBLICATIONS

Motorola M68000 Programmer's Reference Manual, 5th Edition 1986, pp. 2-1, B58-B59.

"Performance Evaluation of Various Enlargement/Reduction Methods" Information Processing Society of Japan, vol. 26, No. 5, Sep. 1985.

*Primary Examiner*—Phu K. Nguyen
*Attorney, Agent, or Firm*—Kenyon & Kenyon

[57] ABSTRACT

A graphic processor which controls reading, writing and transfer of graphic data for a display memory that stores graphic data. The processor includes a first unit which stores first address information for addressing the display memory and first pixel address information which points a pixel position in a word specified by the first address information, a second unit which stores second address information for addressing the display memory and second pixel address information which points a pixel position in a word specified by the second address information, a third unit which shifts graphic data of multiple pixels included in two consecutive words to extract continuous 1-word graphic data, and a fourth unit which implements drawing computations pixel-wise concurrently for one word depending on the number of pixels included in a word. Even if transfer source graphic data lies across two consecutive words, the processor fetches the source data in single reading, processes the data word-wise at once, and stores the result in the display memory.

35 Claims, 27 Drawing Sheets

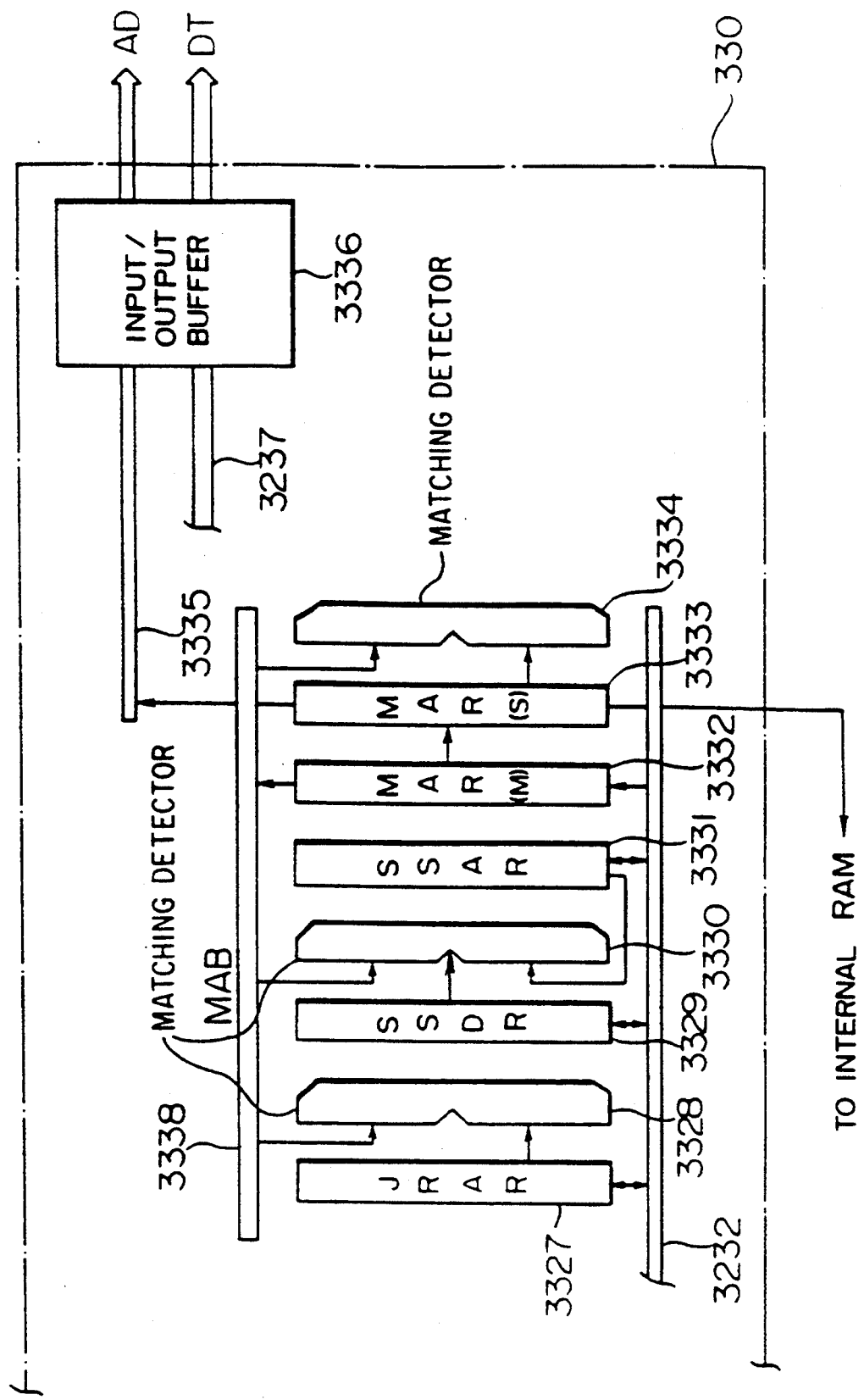

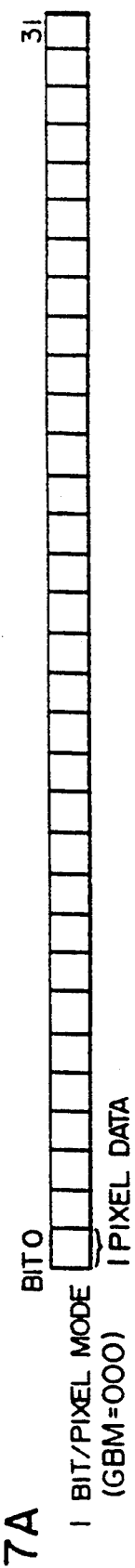 FIG. 7A  1 BIT/PIXEL MODE (GBM=000)
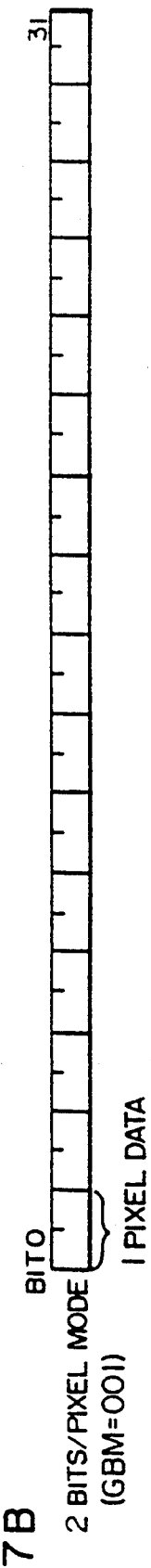 FIG. 7B  2 BITS/PIXEL MODE (GBM=001)
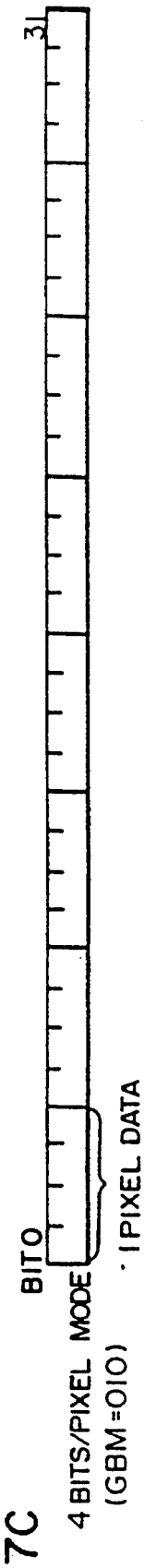 FIG. 7C  4 BITS/PIXEL MODE (GBM=010)
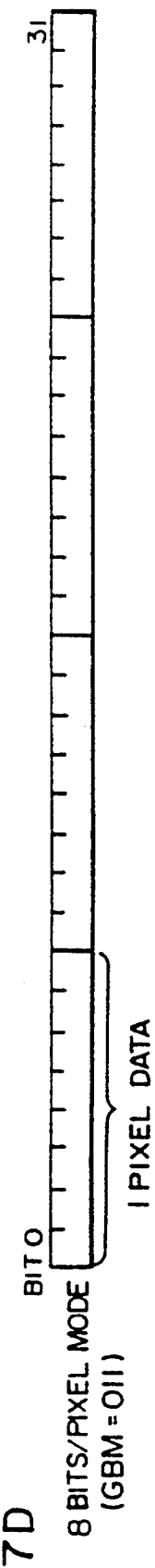 FIG. 7D  8 BITS/PIXEL MODE (GBM=011)
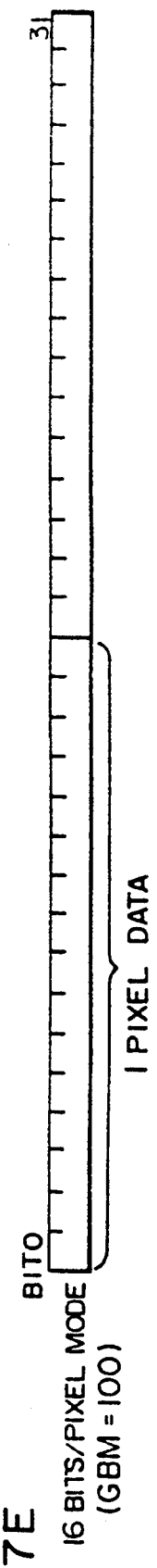 FIG. 7E  16 BITS/PIXEL MODE (GBM=100)

1 BIT/PIXEL MODE
(GBM=000)

2 BITS/PIXEL MODE
(GBM=001)

4 BITS/PIXEL MODE
(GBM=010)

8 BITS/PIXEL MODE
(GBM=011)

16 BITS/PIXEL MODE
(GBM=100)

| CCMPM | COLOR DESTINATION DATA | | 2-LEVEL DESTINATION DATA/ COLOR SOURCE DATA | | D:2-LEVEL/ S:2-LEVEL |
|---|---|---|---|---|---|
| | CONDI-TION | CONDITIOINAL OPERATION MODE | CONDI-TION | 2-LEVEL FORMATTING MODE | |
| 0000 | — | EXECUTES COLOR DATA COMPUTATION UNCONDITIONALLY | — | BECOMES 1 UNCONDITIONALLY | CCMPM HAS NO EFFECT |
| 0001 | D= CLCMP | EXECUTES COLOR DATA COMPUTATION IF D EQUALS TO CLCMP | S= CLCMP | BECOMES 1 IF S EQUALS TO CLCMP; OTHERWISE 0 | |
| 0010 | D< CLCMP | EXECUTES COLOR DATA COMPUTATION IF CLCMP IS GREATER THAN D IN CODE | S< CLCMP | BECOMES 1 IF CLCMP IS GREATER THAN S IN CODE; OTHERWISE 0 | |
| 0011 | D≦ CLCMP | EXECUTES COLOR DATA COMPUTATION IF CLCMP IS GREATER THAN OR EQUALS TO S IN CODE | S≦ CLCMP | BECOMES 1 IF CLCMP IS GREATER THAN OR EQUAL TO S IN CODE; OTHERWISE 0 | |
| 0100 | 0 | NOT EXECUTE COLOR DATA COMPUTATION UNCONDITIONALLY | 0 | BECOMES 0 UNCONDITIONALLY | |
| 0101 | D≠ CLCMP | EXECUTES COLOR DATA COMPUTATION IF D IS UNEQUAL TO CLCMP | S≠ CLCMP | BECOMES 1 IF S IS UNEQUAL TO CLCMP; BECOMES 0 IF EQUAL | |
| 0110 | D> CLCMP | EXECUTES COLOR DATA COMPUTATION IF CLCMP IS SMALLER THAN D IN CODE | S> CLCMP | BECOMES 1 IF CLCMP IS SMALLER THAN S IN CODE; OTHERWISE 0 | |
| 0111 | D≧ CLCMP | EXECUTES COLOR DATA COMPUTATION IF CLCMP IS SMALLER THAN OR EQUAL TO D IN CODE | S≧ CLCMP | BECOMES 1 IF CLCMP IS SMALLER THAN OR EQUAL TO S; OTHERWISE 0 | |

NOTE: D SIGNIFIES DISTINATION DATA, S AND S' SIGNIFY SOURCE DATA, AND CLCMP SIGNIFIES DATA IN CLCMP REGISTER.

FIG. 13A

| CCMPM | COLOR DESTINATION DATA | | 2-LEVEL DESTINATION DATA/ COLOR SOURCE DATA | | D:2-LEVEL/ S:2-LEVEL |
|---|---|---|---|---|---|
| | CONDITION | CONDITIONAL OPERATION MODE | CONDITION | 2-LEVEL FORMATTING MODE | |
| 1001 | — | EXECUTES COLOR DATA COMPUTATION UNCONDITIONALLY | | | CCMPM HAS NO EFFECT |
| 1010 | D=S' | EXECUTES COLOR DATA COMPUTATION IF D EQUALS TO S' | | | |
| 1011 | D<S' | EXECUTES COLOR DATA COMPUTATION IF S IS GREATER THAN D IN CODE | | | |
| 1100 | D≦S' | EXECUTES COLOR DATA COMPUTATION IF S IS GREATER THAN OR EQUAL TO D IN CODE | | | |
| 1100 | 0 | NOT EXECUTE COLOR DATA COMPUTATION UNCONDITIONALLY | | | |
| 1101 | D≠S' | EXECUTES COLOR DATA COMPUTATION IF D IS UNEQUAL TO S' | | | |
| 1110 | D>S' | EXECUTES COLOR DATA COMPUTATION IF S' IS SMALLER THAN D IN CODE | | | |
| 1111 | D≧S' | EXECUTES COLOR DATA COMPUTATION IF S' IS SMALLER THAN OR EQUAL TO D IN CODE | | | |

NOTE: D SIGNIFIES DISTINATION DATA, S AND S' SIGNIFY SOURCE DATA, AND CLCMP SIGNIFIES DATA IN CLCMP REGISTER.

| OPM | LOGICAL OPERATIONS |
|---|---|
| 00000 | D' = 0 |
| 00001 | D' = S' AND D |
| 00010 | D' = S' AND (NOT D) |
| 00011 | D' = S' |
| 00100 | D' = (NOT S') AND D |
| 00101 | D' = D |
| 00110 | D' = S' X OR D |
| 00111 | D' = S' OR D |
| 01000 | D' = NOT (S' OR D) |
| 01001 | D' = NOT (S' X OR D) |
| 01010 | D' = NOT D |
| 01011 | D' = S' OR (NOT D) |
| 01100 | D' = NOT S' |
| 01101 | D' = (NOT S') OR D |
| 01110 | D' = NOT (S' AND D) |
| 01111 | D' = I |

| OPM | ARITHMETIC OPERATIONS |
|---|---|
| 10000 | D' = D + S' |
| 10001 | D' = D - S' |
| 10010 | D' = D + S' (SATURATE) |
| 10011 | D' = D - S' (SATURATE) |

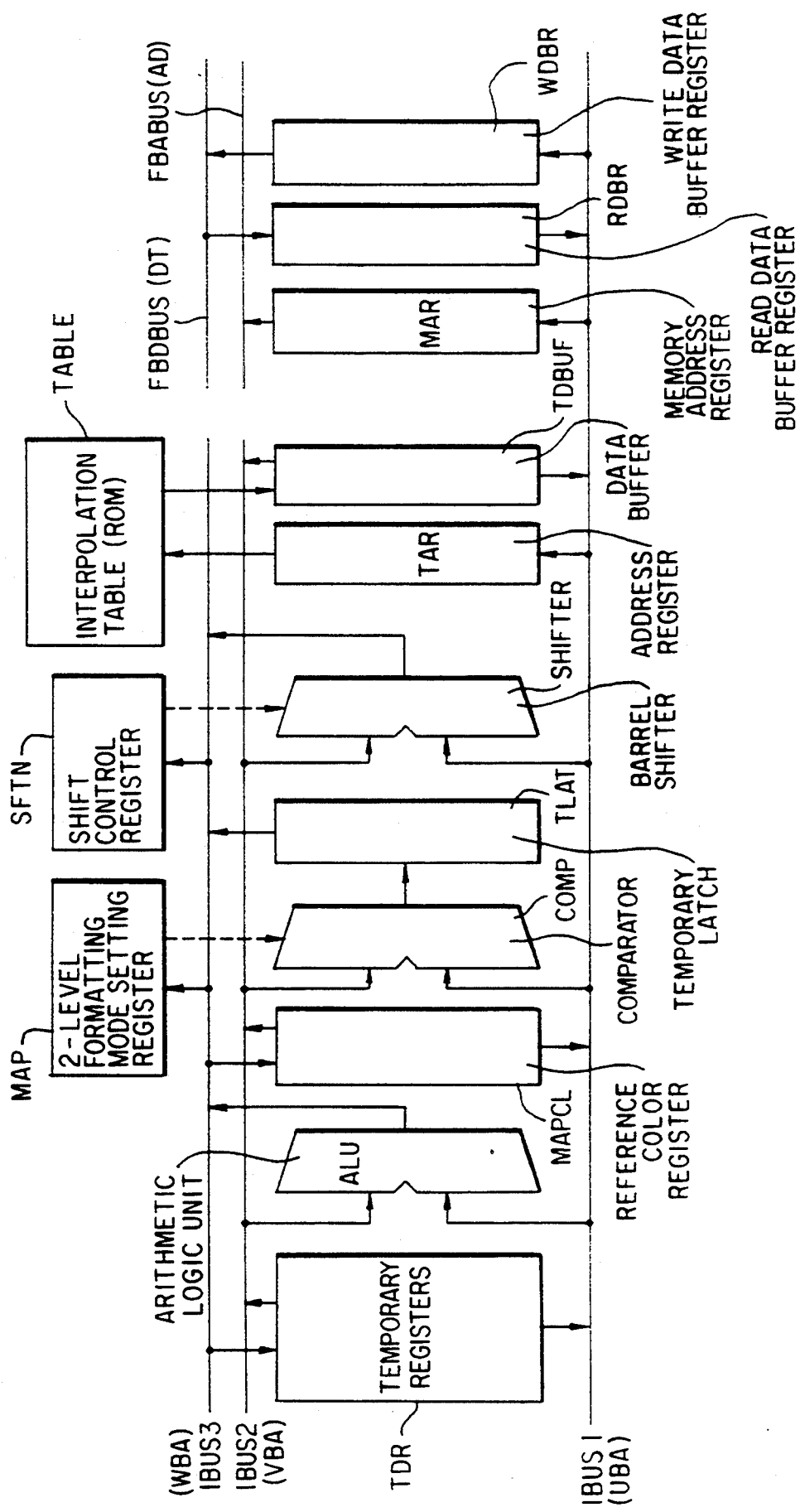
F I G. 20

FIG. 24

| TYPE \ ITEM | MONOCHROME INTERPOLATION TABLE | COLOR INTERPORATION TABLE |
|---|---|---|
| TABLE | $P_0$ at top-left (hatched), $P_3$ top-right, $P_1$ bottom-left, $P_2$ bottom-right; 4×4 grid values: row1 1,1,0,0; row2 1,0,0,0; row3 0,0,0,0; row4 0,0,0,0 | $P_0$ at top-left (hatched), $P_3$ top-right, $P_1$ bottom-left, $P_2$ bottom-right; 4×4 grid values: row1 0,0,3,3; row2 0,3,3,3; row3 1,1,2,2; row4 1,1,2,2 |
| SURROUNDING PIXELS $P_0 \sim P_3$ | • MONOCHROME PIXELS<br>• BLACK PIXEL $P_0$ IS ACTIVE ON CRT SCREEN<br>• WHITE PIXELS $P_1 \sim P_3$ ARE INACTIVE ON CRT SCREEN | • COLOR PIXELS<br>• BLACK PIXEL $P_0$ BECOMES "1" BY 2-LEVEL FORMATTING<br>• WHITE PIXELS $P_1 \sim P_3$ BECOME "0" BY 2-LEVEL FORMATTING |
| AREA DIVISION NUMBER IN TABLE | • REPRESENTS COLOR<br>• "1" MEANS ACTIVE BLACK ON CRT SCREEN; "0" MEANS INACTIVE WHITE ON CRT SCREEN | • DESIGNATES A SURROUNDING PIXEL<br>• "0" SPECIFIES PIXEL $P_0$ |

| 2 | 2 | 1 | 1 | 2 | 2 | 1 | 1 | 3 | 3 | 0 | 0 | 3 | 3 | 0 | 0 |

| 10 | 10 | 01 | 01 | 10 | 10 | 01 | 01 | 11 | 11 | 00 | 00 | 11 | 11 | 00 | 00 |

31　　　　23　　　　15　　　　7　　　0 ← BIT POSITION

FIG. 26

| NUMBER | 0 | 1 | 2 | 3 |
|---|---|---|---|---|
| INTERPOLATION TABLE | 0 0 3 3 / 0 0 3 3 / 1 1 2 2 / 1 1 2 2 | 0 0 3 3 / 0 3 3 3 / 1 1 2 2 / 1 1 2 2 | 0 0 3 3 / 0 0 3 3 / 1 2 2 2 / 1 1 2 2 | 0 0 0 3 / 0 0 0 3 / 1 1 1 2 / 1 1 1 2 |
| HEX. NOTATION | A5A5F0F0 | A5A5CF0 | A5A9F0F0 | 9595C0C0 |

| NUMBER | 4 | 5 | 6 | 7 |
|---|---|---|---|---|
| INTERPOLATION TABLE | 0 0 3 3 / 0 0 3 3 / 1 1 1 2 / 1 1 2 2 | 0 0 0 3 / 0 0 0 2 / 0 2 2 2 / 1 2 2 2 | 0 0 3 3 / 1 1 2 2 / 1 1 2 2 / 1 1 2 2 | 0 0 0 3 / 0 0 0 0 / 1 1 2 2 / 1 1 2 2 |
| HEX. NOTATION | A595F0F0 | A9A880C0 | A5A5A5F0 | A5A500C0 |

| NUMBER | 8 | 9 | 10 | 11 |
|---|---|---|---|---|
| INTERPOLATION TABLE | 0 0 3 3 / 0 0 0 3 / 1 1 2 2 / 1 1 2 2 | 0 0 3 3 / 0 0 3 3 / 0 0 3 3 / 1 1 2 2 | 0 3 3 3 / 1 3 3 3 / 1 1 1 3 / 1 1 1 2 | 0 0 3 3 / 0 0 3 3 / 1 1 1 3 / 1 1 1 2 |
| HEX. NOTATION | A5A5C0F0 | A5F0F0F0 | 95D5FDFC | 95D5F0F0 |

| NUMBER | 12 | 13 | 14 | 15 |
|---|---|---|---|---|
| INTERPOLATION TABLE | 0 3 3 3 / 0 3 3 3 / 1 2 2 2 / 1 2 2 2 | 0 0 3 3 / 0 0 3 3 / 0 2 2 2 / 1 2 2 2 | 0 3 3 3 / 1 3 3 3 / 1 1 2 2 / 1 1 2 2 | 0 0 3 3 / 0 0 3 3 / 1 1 2 2 / 1 1 2 2 |
| HEX. NOTATION | A9A9FCFC | A9A8F0F0 | A5A5FDFC | A5A5F0F0 |

FIG. 29

| MAP | | | 2-LEVEL FORMATTING MODES | |
|---|---|---|---|---|
| MAP$_2$ | MAP$_1$ | MAP$_0$ | CONDITION OF MAKING 1 | CONDITION OF MAKING 0 |
| 0 | 0 | 0 | MAKES 1 FOR Pi UNCONDITIONALLY | |
| 0 | 0 | 1 | [MAPCL] = [Pi] | [MAPCL] $\neq$ [Pi] |
| 0 | 1 | 0 | [MAPCL] $\leq$ [Pi] | [MAPCL] > [Pi] |
| 0 | 1 | 1 | [MAPCL] < [Pi] | [MAPCL] $\geq$ [Pi] |
| 1 | 0 | 0 | MAKES 0 FOR Pi UNCONDITIONALLY | |
| 1 | 0 | 1 | [MAPCL] $\neq$ [Pi] | [MAPCL] = [Pi] |
| 1 | 1 | 0 | [MAPCL] $\geq$ [Pi] | [MAPCL] < [Pi] |
| 1 | 1 | 1 | [MAPCL] > [Pi] | [MAPCL] $\leq$ [Pi] |

GRAPHIC DATA PROCESSING SYSTEM

This is a continuation of U.S. patent application Ser. No. 07/942,001 filed on Sep. 8, 1992, now U.S. Pat. No. 5,319,750 which is a continuation of U.S. patent application Ser. No. 544,503 filed on Jun. 27, 1990, now U.S. Pat. No. 5,202,962 issued on Apr. 13, 1993, which is a division of U.S. patent application Ser. No. 07/175,418 filed on Mar. 30, 1988, now U.S. Pat. No. 4,965,750 issued on Oct. 23, 1990.

BACKGROUND OF THE INVENTION

This invention relates to a graphic data processor system and a graphic processor based on a bit-map method and, particularly, to a graphic data processing system suitable for graphic data transfer and conversion processes in a display memory.

Conventional graphic processors having their graphic processing functions, fabricated in integrated circuits are disclosed in, for example, U.S. patent application Ser. No. 727,850 filed on Apr. 26, 1985 and U.S. patent application Ser. No. 686,039 filed on Dec. 24, 1985. These graphic processors are designed to express graphic data corresponding to one picture element or pixel by using a plurality of bits.

Generally, a graphic processor deals with data in word units, e.g., 32-bit words, and the number of bits used to express a pixel is less than the number of bits of a word in many cases. Accordingly, when a graphic processor of 32-bit word processes graphic data in the form of 4-bits per pixel, it can treat a maximum of eight pixels with one word.

The above mentioned graphic processor of patent application Ser. No. 727,850, even though it has a 32-bit word structure, deals with graphic data in units of aa pixel. Therefore it needs to repeatedly perform a writing operation or transfer operation for plurality of times the number of which depends on the number of pixels even when writing or transferring graphic data of consecutive pixels within a word. This imposes a problem of an increased number time that there must be access to the display memory in which graphic data is stored, and as a result a lowering of the processing speed.

Graphic processors of this type are intended to display, in many cases, graphic figures in color or multiple tones, and when such color or multi-tone graphic data is printed on a black-and-white printer, the graphic data needs to be converted into 2-level (or binary) graphic data. Conversely, in the case of a combination of a black-and-white graphic figure on a processor and a color printer, the 2-level graphic data needs to be converted to multi-tone graphic data.

These data conversion processes are conventionally implemented pixel-by-pixel on a software basis, which expends several µs to several tens µs per pixel. This imposes a problem of considerable time consumption in data conversion for all pixels.

A graphic processor which implements enlargement, reduction, rotation, etc. for the original image data, while interpolating the original image data is shown. An example of the interpolation process for image data including enlargement and reduction of figures is described in an article entitled "Performance Evaluation of Various Enlargement/Reduction Methods for 2-level Image Data and Method of Improving the Processing Speed", pp. 920–925 in the publication of Information Processing Society of Japan, Vol. 26, No. 5, published in September 1985. In this known technique to accelerate the process, the integral coordinate interval of transfer source data is divided four ways in each of the x and y directions. Further interpolated data, each determined from whether the four pixels are black or white around an intermediate coordinate position corresponding to the transfer destination coordinates, is prepared as a table in advance.

The above-mentioned prior art is pertinent to the interpolation of 2-level image data (monochrome image data), and does not deal with the color image interpolation in which a pixel is expressed in a plurality of bits. Therefore, the enlargement and reduction process for color image data is compelled to base the interpolation on the software using a CPU or the like, which imposes a problem in enhancing the speed of the process.

SUMMARY OF THE INVENTION

The first object of the present invention is to provide a graphic processing system including a graphic processor capable of processing graphic data at a high speed.

The second object of the present invention is to provide a graphic processing system including a graphic processor capable of converting graphic data from color to monochrome or from monochrome to color at a high speed.

The third object of the present invention is to provide a means of high-speed interpolation accompanied by enlargement or reduction of characters or graphic figures expressed by color data.

The above first object is achieved by the provision of a second unit which stores second address information for the display memory as well as second pixel address information which points the to a position of a in a word pointed to by the second address information. A third unit shifts graphic data of pixels included in consecutive two words to extract a continuous word of graphic data. A fourth unit which implements the drawing operation for one word concurrently in units of a pixel (pixel-wise concurrently) depending on the number of pixels included in a word. The third unit shifts graphic data from a transfer source as read out by a first address information, thereby extracting graphic data in one word inclusive of graphic data for the transfer destination specified by the second address information and the associated pixel position. This allows the fourth unit to process graphic data for the transfer destination address specified by the second address information concurrently in units of a word. Even if graphic data for the transfer destination lies across two consecutive two words, graphic data of the transfer source can be processed at once in units of a word following single reading.

Graphic data conversion from color to monochrome, is achieved by additionally providing addition a sixth unit which stores certain display data, and a seventh unit which operates on the fourth unit to carry out the drawing operation for only a specified bit. Graphic data conversion from monochrome to color is accomplished by additionally providing, an expanding unit which expands graphic data of one bit to a plurality of bits, a memory unit which stores color graphic data corresponding to monochrome graphic data, and an output unit which selectively delivers, in bit units, color graphic data stored in the memory unit in accordance with the expanded graphic data from the expanding unit.

In converting graphic data from color to monochrome, the expanding unit converts color graphic data into monochrome graphic data by making reference to graphic data stored in the sixth unit, and the fourth unit delivers, from among converted data only, bits specified by the seventh unit and writes the bits into the display memory. Consequently, graphic data can be transferred to the destination address while being converted from color to monochrome.

In converting graphic data from monochrome to color, the expanding unit expands graphic data of one bit into graphic data of multiple bits, and the memory unit draws out color graphic data. The color graphic data is written by the fourth unit into the display memory. Consequently, graphic data can be transferred to the destination address while being converted from monochrome to color. Accordingly, graphic data lying across two consecutive words can be converted from monochrome to color or from color to monochrome at once.

The third object of the present invention is achieved by providing a first unit which stores the transfer source coordinates, a second unit which stores intermediate points produced by dividing the transfer source coordinate interval into a divisions in each of x and y directions, a third unit which stores the transfer destination coordinates, a fourth unit which fetches color data from the transfer destination coordinates and makes 2-level (binary) data at a certain threshold, and a fifth unit which, if the transfer source coordinates corresponding to the transfer destination coordinate are the intermediate coordinates indicated by the second unit, reads out four pixels around the intermediate coordinates, which are then made 2-level data individually by the fourth unit, and determines from a table of information in response to the intermediate coordinates calculated by the second unit as to which of the four pixels should be transferred.

The 2-level threshold function for image data provided in the drawing processor incorporated in the graphic processor compares image data fetched from a frame buffer for holding image data with the value of a mapping color register set by the user of the graphic processor, and provides a comparison result as 0 or 1. The 0/1 result is used to calculate the address for reading 16 kinds of interpolation tables stored in a read-only memory.

The interpolation table is used by coordinate calculation, in the image editing process, of the case when the coordinates are located between two pixel positions on the CRT screen, for selecting one of four surrounding pixels for use in image data computation. On this account, the area surrounded by the four pixels is divided into a total of 16 divisions by dividing the area by 4 ways along both the in both horizontal and vertical directions. The 16 divided small regions are numbered so as to address the surrounding four pixels, and one of four pixels is designated using the region number including the coordinates.

BRIEF DESCRIPTION OF THE DRAWINGS

FIGS. 3 to 6 are block diagrams showing in more detail the embodiment of FIG. 2.

FIGS. 7A to 7E are diagrams showing a bit structure of a display memory in a graphic mode.

FIGS. 13A and 13B are is a table showing the condition of color comparison mode.

FIG. 14 is a table showing the functions of computation modes.

FIG. 20 is a block diagram showing the hardware arrangement of each functional block shown in FIG. 19.

FIG. 24 is a list comparing an interpolation table stored in a read-only memory in FIG. 20 with a conventional 16-division table.

FIG. 26 is a list of examples of the interpolation table.

FIG. 29 is a list showing an example of the image data threshold function; and

DETAILED DESCRIPTION

Figure 1:
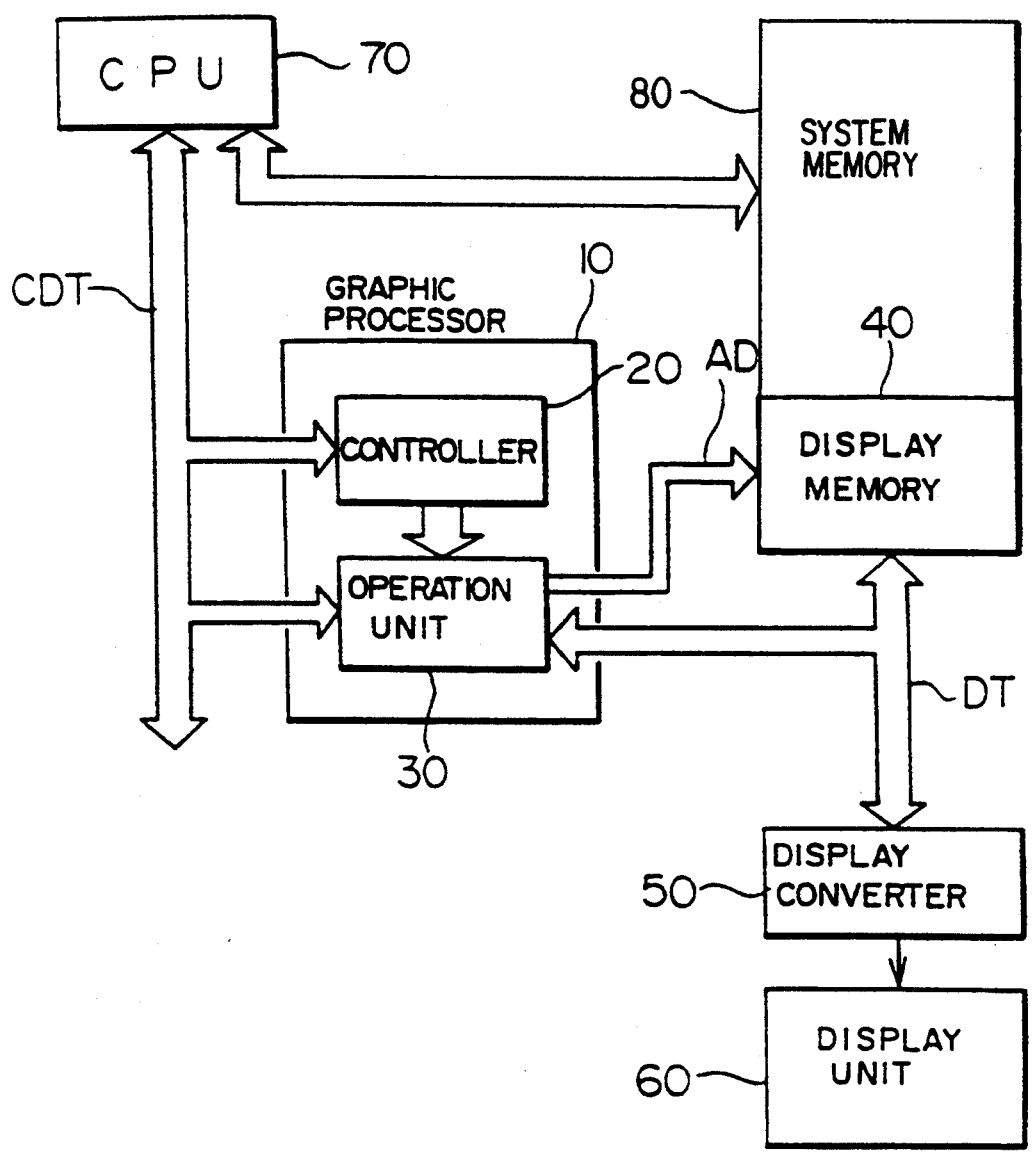
FIG. 1 is a block diagram showing a typical system to which the graphic processor of the present invention may be applied.

FIG. 1 is a block diagram showing a typical system to which the graphic processor of the present invention may be applied. In the figure, a graphic processor 10 includes an operation unit 30 which writes, rewrites and reads graphic data in a display memory 40, and a control unit 20. The control unit 20 controls the operation unit 30 in a constant sequence. The graphic processor 10 reads graphic data out of the display memory 40, and it is converted into a video signal by a display converter 50 and displayed on a display unit 60.

The control unit 20 controls the operation unit 30 to calculate address information, including memory address information for the display memory 40 and pixel address information for identifying or pointing to a position in 1-word of graphic data corresponding to a pixel. The operation unit 30 fetches a word of graphic data at the calculated address and implements the drawing logical/arithmetic operation in accordance with pixel position information formed by decoding pixel address information so that only bits of certain pixels of 1-word of graphic data are operated or in case of rewriting only one pixel for the fetched graphic data or all bits of 1-word of graphic data in accordance with pixel position information formed by decoding the pixel address information or in accordance with the memory address information in case of rewriting all bits of one word, and then stores the operation result in the display memory 40.

A CPU 70 transfers instructions and parameters for the graphic processor 10 and controls the graphic processor 10.

FIG. 1 illustrates CPU 70 and graphic processor 10 as being independently operated, with CPU 70 controlling the entire system. The following describes embodiments in which the graphic processor 10 performs certain functions according to the present invention. However, these functions need not entirely be performed by graphic processor 10 of the graphic data processing system illustrated in FIG. 1. For example, these features may be performed by the CPU 70 either alone or in conjunction with graphic processor 10.

Additionally, FIG. 1 illustrates a system memory 80 (or main memory) for storing information such as instructions, commands, data, programs, etc. processed by the CPU 70. According to an embodiment of the present invention, the system memory 80 may include a region storing the image data of display memory 40. Further, the display memory 40 may be included in the system memory 80, as illustrated in FIG. 1.

Figure 2:
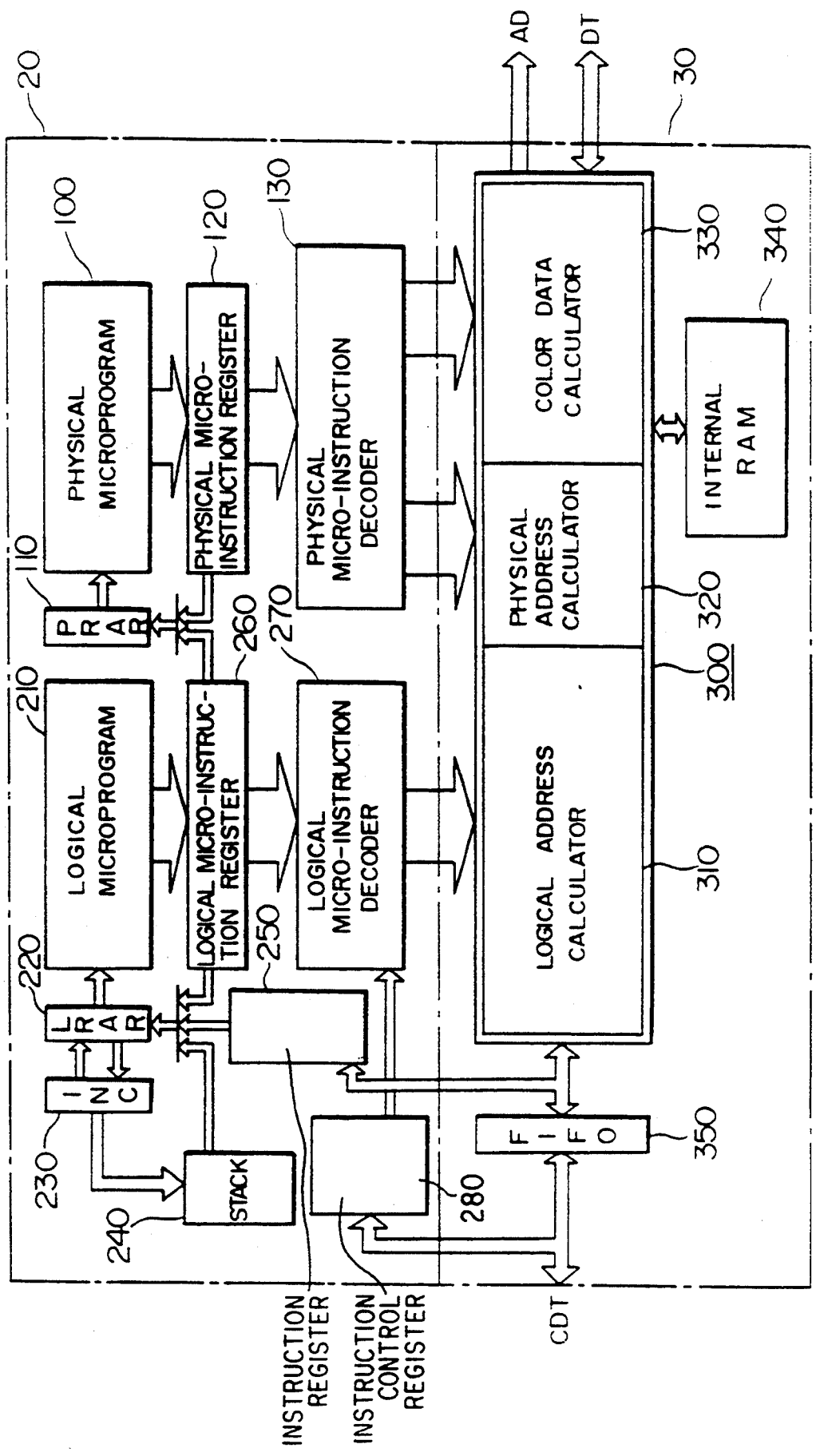
FIG. 2 is a block diagram showing in detail an embodiment of the graphic processor according to the present invention.

FIG. 2 is a block diagram showing in detail an embodiment of the graphic processor 10 in FIG. 1 in accordance with the present invention. This embodiment is intended for high-speed graphic data processing and also for high-speed graphic data conversion from color to monochrome or vice versa. In the figure, the controller 20 includes a logical microprogram memory 210, a logical micro-instruction register 260, a logical microprogram ROM address register (LRAR) 220, an address incrementer (INC) 230, a stack 240, an instruction register 250, a logical micro-instruction decoder 270, an instruction control register 280, a physical microprogram memory 100, a physical microprogram ROM address register (PRAR) 110, a physical micro-instruction register 120, and a physical micro-instruction decoder 130.

The operation unit 30 includes an operation controller 300, an a first in first out (FIFO) memory 350 and an internal RAM 340.

Among the functional blocks, the operation controller 300 includes a logical address calculator 310, a physical address calculator 320, and a color data calculator 330. The logical address calculator 310 mainly calculates the location of the drawing point on the screen in accordance with the drawing algorithm, the physical address calculator 320 calculates the address of the display memory 40, and the color data calculator 330 calculates color data to be written into the display memory 40.

Next, the structure of the operation controller 300 will be described in more detail.

Figure 3:
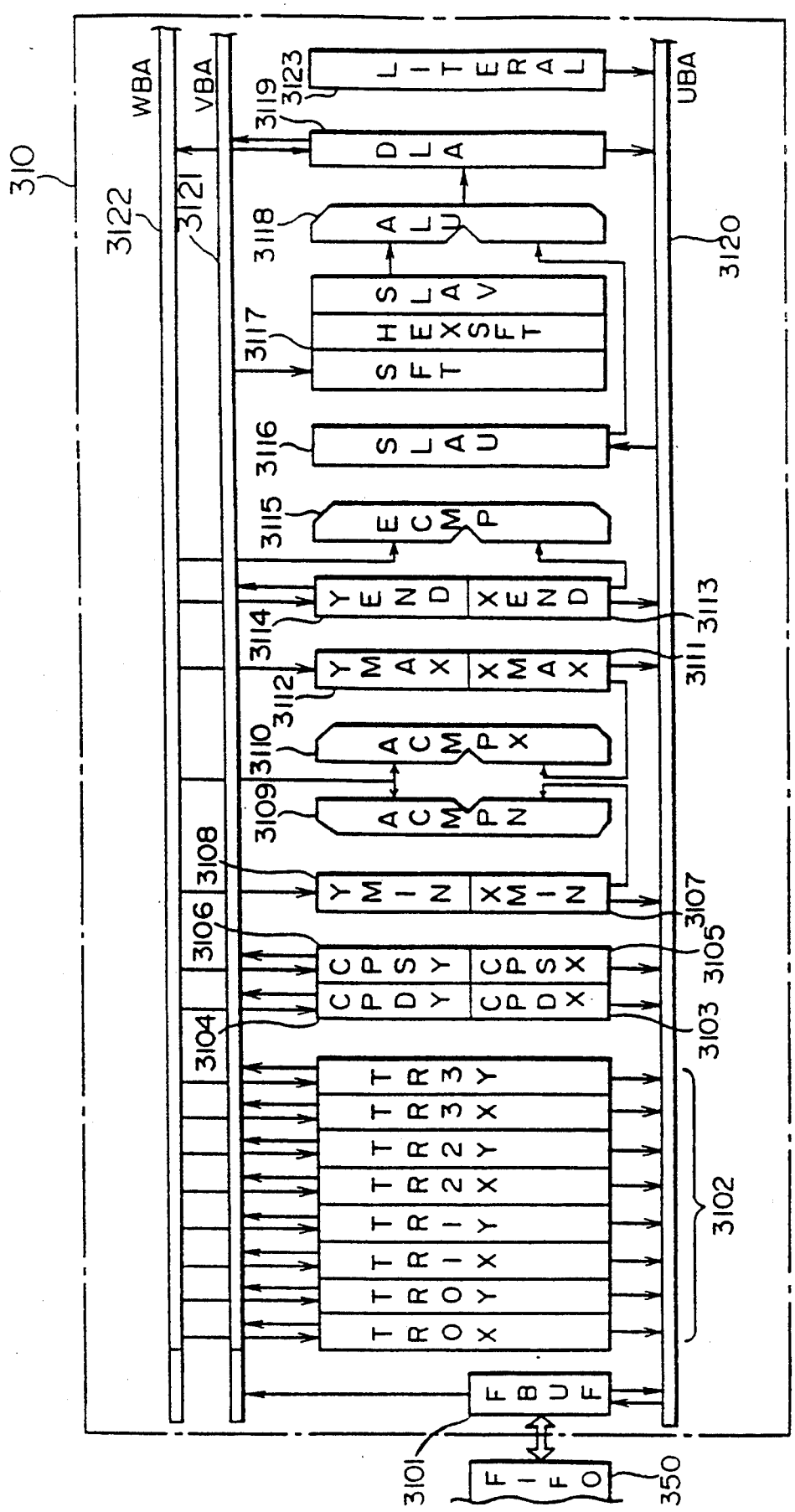

In FIG. 3, the logical address calculator 310 includes an FIFO buffer 3101, a set of general-purpose registers (TR0X, TR0Y, TR1X, TR1Y, TR2X, TR2Y, TR3X, TR3Y) 3102, drawing coordinate current pointers (CPDX) 3101 and (CPDY) 3104 which indicate the drawing coordinates, transfer source coordinate current pointers (CPSX) 3105 and (CPSY) 3106 which indicate the transfer source coordinates, area control registers (XMIN) 3107, (YMIN) 3108, (XMAX) 3111 and (YMAX) 3112, area judgement comparators (ACMPN) 3109 and (ACMPX) 3110, end point registers (XEND) 3113 and (YEND) 3114, an end judgement comparator (ECMP) 3115, source latches (SFT, HEXSFT, SLAV) 3117 and (SLAV) 3116, an arithmetic-logic unit (ALU) 3118, a destination latch (DLA) 3119, a constant generator (LITERAL) 3123, reading buses (UBA) 3120 and (VBA) 3121, and a writing bus (WBA) 3122.

Figure 4:
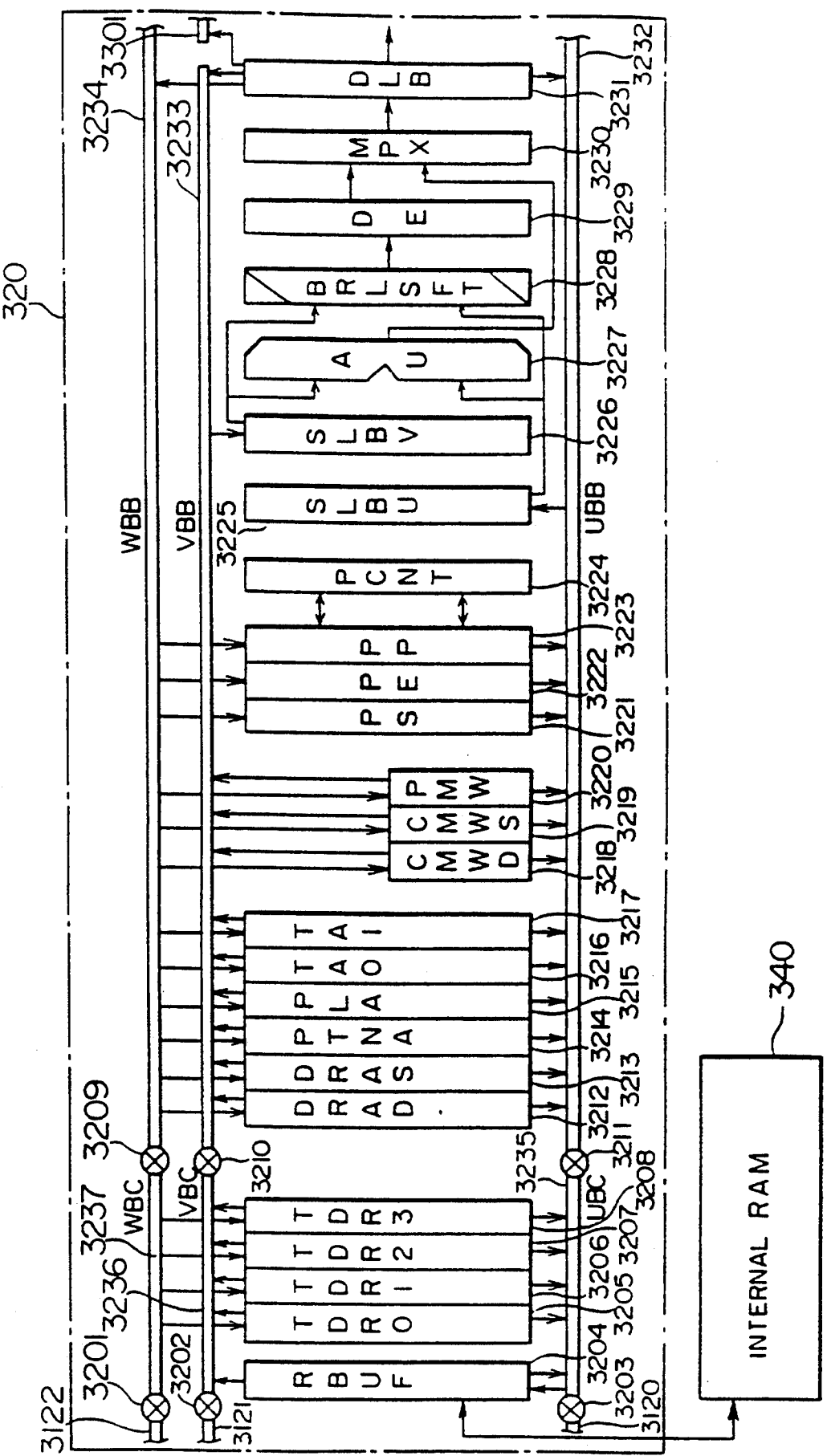

FIG. 4 is a block diagram showing in detail the physical address calculator 320. It includes an internal RAM buffer (RBUF) 3204, a set of general-purpose registers (TDR0, TDR1, TDR2, TDR3) 3205, 3206, 3207 and 3208, a register (DRAD) 3212 which stores the memory address of the drawing coordinate system, a register (PTNA) 3214 which indicates the memory address of pattern coordinate system for storing a painting pattern of figure, a register (PLA) 3215 which indicates the pel areas for bold line drawing, general-purpose registers (TA0, TA1) 3216 and 3217, a register (CMWD) 3218 for storing the memory width of the drawing coordinate system, a register (CMWS) 3219 for storing the memory width of the transfer source coordinate system, a register (PMW) 3220 for storing the memory width of the pattern coordinate system, pattern control registers (PS, PE, PP) 3221, 3222 and 3223, a pattern counter (PCNT) 3224, source latches (SLBU) 3225 and (SLBV) 3226, an arithmetic unit (AU) 3227, a barrel shifter (BRLSFT) 3228, a data expander (DE) 3229, a multiplexer (MPX) 3230, a destination latch (DLB) 3231, reading buses (UBB, VBB, UBC, VBC) 3232, 3233, 3235 and 3236, writing buses (WBB, WBC) 3234 and 3237, and bus latches 3201, 3202, 3203, 3209, 3210 and 3211.

Figure 5:
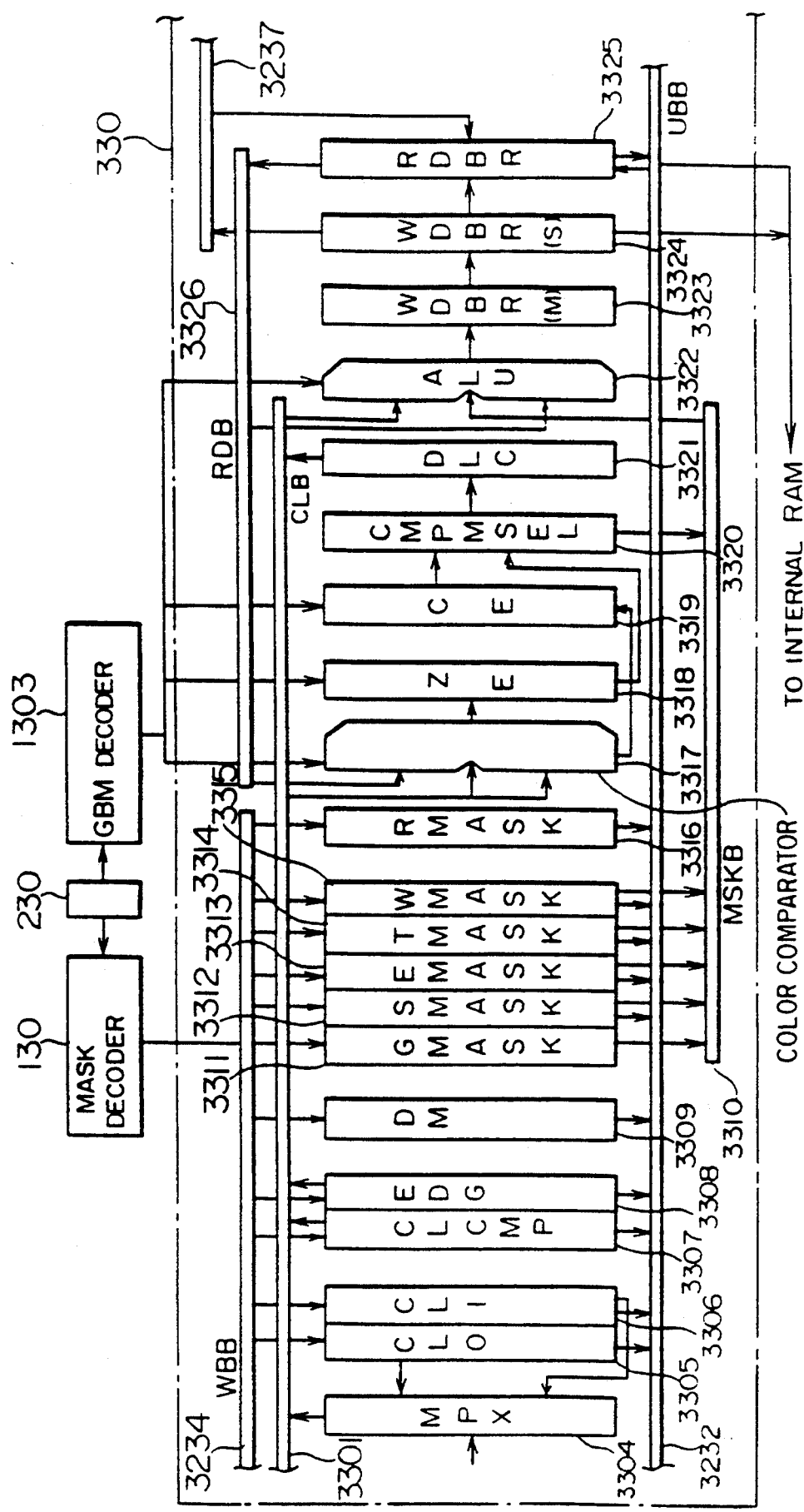

FIGS. 5 and 6 show in detail the color data calculator 330. In the figure, the color data calculator 330 includes a multiplexer 3304, color registers (CL0, CL1) 3305 and 3306, color comparison register (CLCMP) 3307, an edge color register (EDG) 3308, a drawing mode register (DM) 3309, mask registers (GMASK, SMASK, EMASK, TMASK, WMASK, RMASK) 3311, 3312, 3313, 3314, 3315 and 3316, a color comparator 3317, a zero flag expander (ZE) 3318, a carry flag expander (CE) 3319, a color comparison mode selector (CMPMSEL) 3320, a destination latch (DLC) 3321, an arithmetic/logic unit (ALU) 3322, writing data buffers (WDBR(M), WDBR(S)) 3223 and 3224, a reading data buffer (RDBR) 3325, an internal RAM address definition register (JRAR) 3327, a matching detector 3328, a stack area definition register (SSDR) 3329, a matching detector 3330, a stack head address register (SSAR) 3331, memory address registers (MAR(M), MAR(S)) 3332 and 3333, a matching detector 3334, a mask bus (MSKB) 3310, a color data bus (CLB) 3301, a reading data bus (RDB) 3326, a memory input/output bus 3237, an address output bus 3335, a memory address bus (MAB) 3338, and an input/output buffer 3336.

Next, the embodiment arranged as described above will be explained.

First, instructions and parameters, shown as CDT in FIGS. 1 and 2 are sent from the CPU 70 or the like, and they are held in the FIFO 350 and instruction control register 280 of FIG. 2.

The instruction code written in the instruction register 250 by way of the FIFO 350 is entered to a LRAR 220 so as to read out the logical from logical microprogram memory 210. A logical micro-instruction is read out in accordance with the address set in the LRAR 220, and once read out it is held in the logical micro-instruction register 260. After the logical micro-instruction is decoded by the logical micro-instruction decoder 270, it controls the logical address calculator 310 to calculate the logical address. The address incrementer 230 updates the contents of LRAR 220, and logical micro-instructions are read out accordingly. In case a subroutine is called, a return address is set in the stack 240.

To calculate the physical address corresponding to the logical address, the logical micro-instruction from the logical micro-instruction register 260 reads out physical micro-instructions from the physical microprogram memory 100. Physical micro-instructions are used to control the physical address calculator 320 and the color data calculator 330. Part of the logical micro-instructions from the logical micro-instruction register 260 are entered into the PRAR 110 as the address for reading out physical micro-instructions from the physical micro-program 100. Physical micro-instructions read out in accordance with the PRAR 110 are entered a the physical micro-instruction register 120. After being decoded by the physical micro-instruction decoder 130, the physical micro-instructions control the physical address calculator 320 to calculate the physical address, read out graphic data from the display memory using the physical address, implement color data computation with the color data calculator 330, and deliver the resulting data to the display memory 40.

Next, the bit format of each data used in this embodiment will be described, beginning with the graphic mode.

In this embodiment, five different operating modes are available for selection in accordance with the specification of graphic bit mode (GBM) set in the control instruction register 280.

FIGS. 7A–7E show a bit assignments for the word of the display memory 40 in these modes.

(a) 1 bit/pixel mode (GBM=000)

This mode is used to express one pixel using one bit as for a monochrome image. The display memory 40 stores, in its one word, data of consecutive 32 pixels.

(b) 2 bits/pixel mode (GBM=001)

This mode expresses one pixel using two bits. It can be used for a display of up to four colors or four tones. The display memory 40 stores, in its one word, data of consecutive 16 pixels.

(c) 4 bits/pixel mode (GBM=010)

This mode expresses one pixel using four bits. The display memory stores, in its one word, data of consecutive 8 pixels.

(d) 8 bits/pixel mode (GBM=011)

This mode expresses one pixel using 8 bits. The display memory 40 stores, in its one word, data of 4 pixels.

(e) 16 bits/pixel mode (GBM=100)

This mode expresses one pixel using 16 bits. One word of the display memory 40 corresponds to data of 2 pixels.

Figure 8:
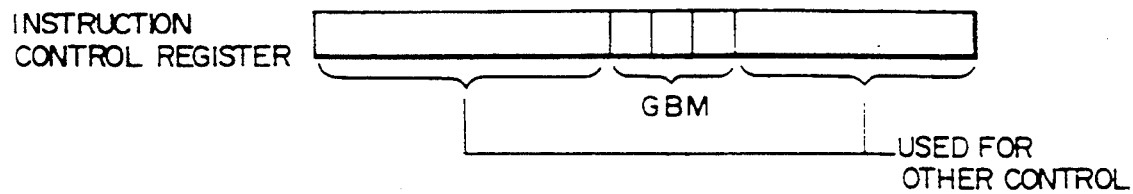
FIG. 8 is a diagram showing the structure of the mode selection register of FIG. 7.
Figure 9A:
FIGS. 9A to 9E are diagrams showing pixel address formats in respective modes.
Figure 9B:
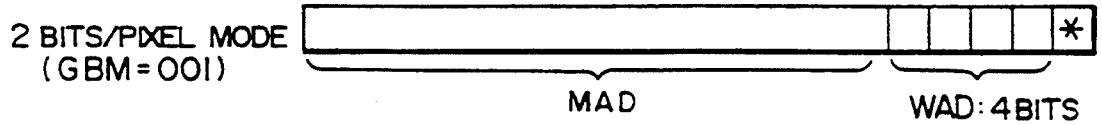
Figure 9C:
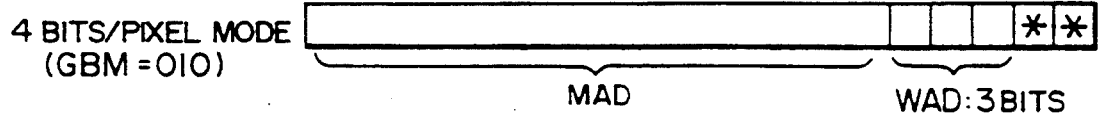
Figure 9D:
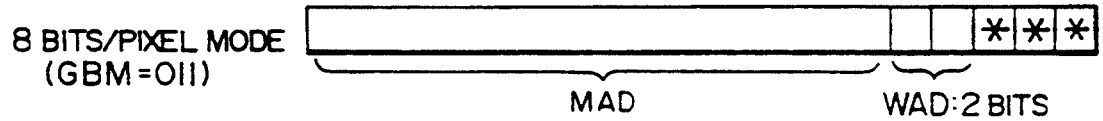
Figure 9E:
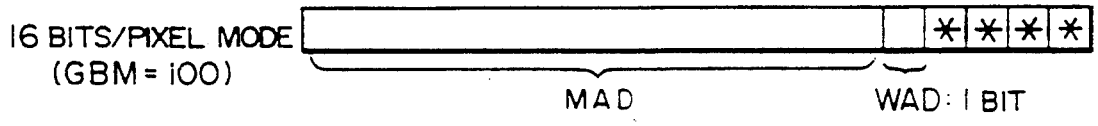

FIG. 8 shows the structure of the instruction control register 280.

Next, the pixel address will be explained.

FIG. 9A–9E explain the pixel address corresponding to each mode shown in FIG. 7. The physical address calculator 320 has associated registers (DRAD, DRAS, PTNA) 3212, 3213 and 3214 used to control the bit address (physical address) WAD which is the memory address added by five bits at the low-order position. The low-order 5-bit information WAD is used to designate the pixel position in a word, and it functions depending on the bit/pixel mode. In the figure, bit positions marked by "*" have no effect for the operation.

Next, a method of high-speed graphic drawing process for the conditional drawing computation for the color and tone will be explained.

Figure 10:
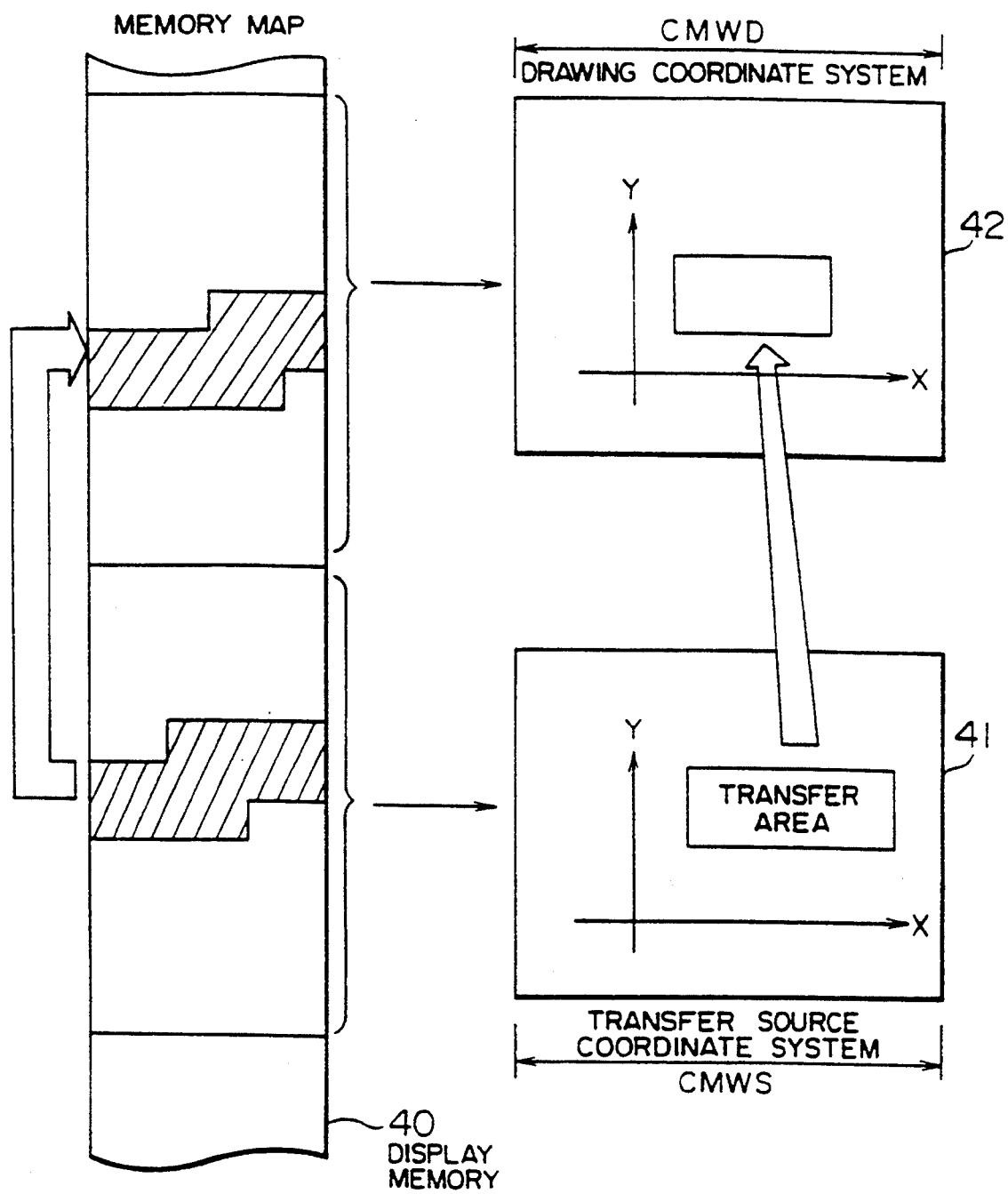
FIG. 10 is a diagram showing the concept of graphic data transfer process.

FIG. 10 shows the transfer of graphic data in a rectangular area defined by the transfer source coordinate system 41 in the display memory 40 into the drawing coordinate system 42, for both sides of the display memory 40 and coordinate system in correspondence. The transfer source coordinate system is a coordinate space indicated by the register (CPSX) 3105 and register (CPSY) 3106, and the memory address corresponding to the coordinates is defined by the register (DRAS) 3213. The drawing coordinate system is a coordinate space indicated by the register (CPDX) 3103 and register (CPDY) 3104, and the memory address corresponding to the coordinates is defined by the register (DRAD) 3212.

Figure 11:
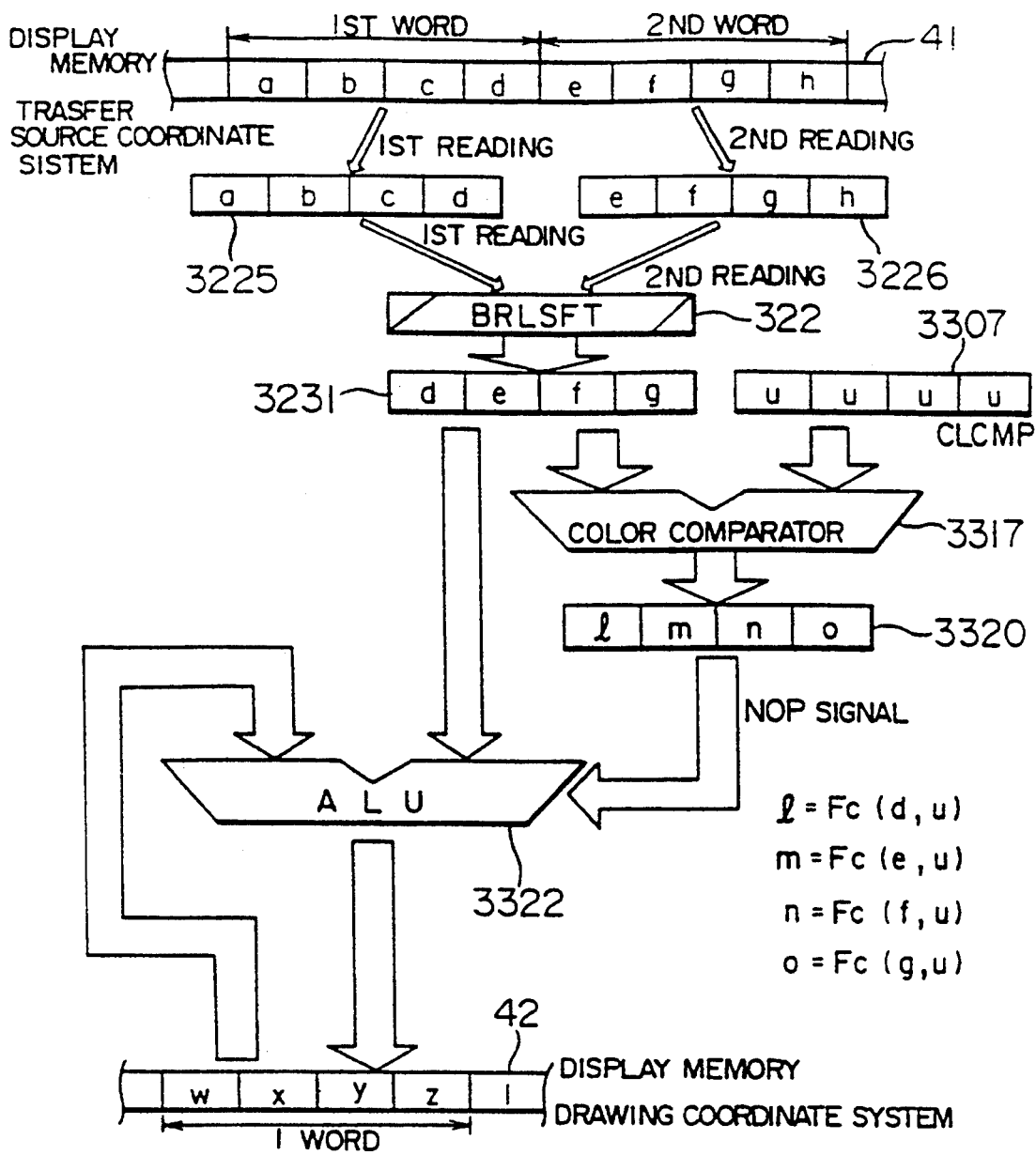
FIG. 11 is a diagram used to explain a high-speed transfer process for graphic data.

FIG. 11 explains the operation of the color data calculator 330 for a graphic data transfer as shown in FIG. 10. In this example there are 8 bits per pixel and 4 pixels per word. Initially, data is read out of the transfer source coordinate system 41 and set in the register (SLBU) 3225 or register (SLBU) 3226. The data is then sent to the barrel shifter (BRLSFT) 3228 and, after being justified to the bit boundary on the drawing coordinate system 42 the data, set in the register (DLB) 3231. The data is sent to the color comparator 3317, in which it is compared with data from the comparison register (CLCMP) 3307, and the result is set in the color comparison mode selector (CMPMSEL) 3320. The color comparator 3317 provides the comparison result in units of pixel at the corresponding bit position. The comparison result is entered to the ALU 3322 as a No-operation (NOP) signal for controlling as to whether data of the drawing coordinate system should be operated on or passed through. The ALU 3322 implements an operation between data from the register (DLB) 3231 and data from the drawing coordinate system. At this time, the NOP signal controls pixels to be operated or pixels of the drawing coordinate system to be passed through. The resulting data is written back to the drawing coordinate system 42.

Figure 12:
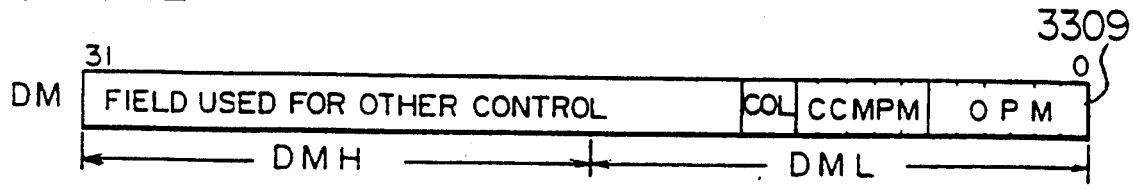
FIG. 12 is a diagram showing the structure of a drawing mode register.

FIG. 12 shows the structure of the drawing mode register (DM) 3309 for holding the operation mode and color comparison mode. The register has a field CCMPM for setting a color comparison mode from among the modes shown in FIG. 13, and a field OPM for setting an operation mode from among the modes shown in FIG. 14.

Through the above operations, four pixels in a word can be processed concurrently, and the the processing is accelerated. In this embodiment, however, the pixel arrangement in a word falls into five GBM modes as shown in FIG. 7. Accordingly, five sets of color comparators 3317 and ALUs 3322 are required for the concurrent processings for pixels in one word, resulting in an increased hardware components. In this embodiment, the color comparator 3317 is provided with a unit for controlling the carry propagation of each bit, a zero flag expander 3318 which expands in units of pixel the matching signal produced from each bit selectively in accordance with GBM, and a carry flag expander 3319 which expands in units of pixel the carry signal produced from each bit selectively in accordance with GBM. Further the ALU 3322 is provided with a unit for controlling the carry propagation, so that multiple pixels in one word can be processed concurrently with one type of color comparator and one type of ALU for five kinds of GBM.

Figure 15:
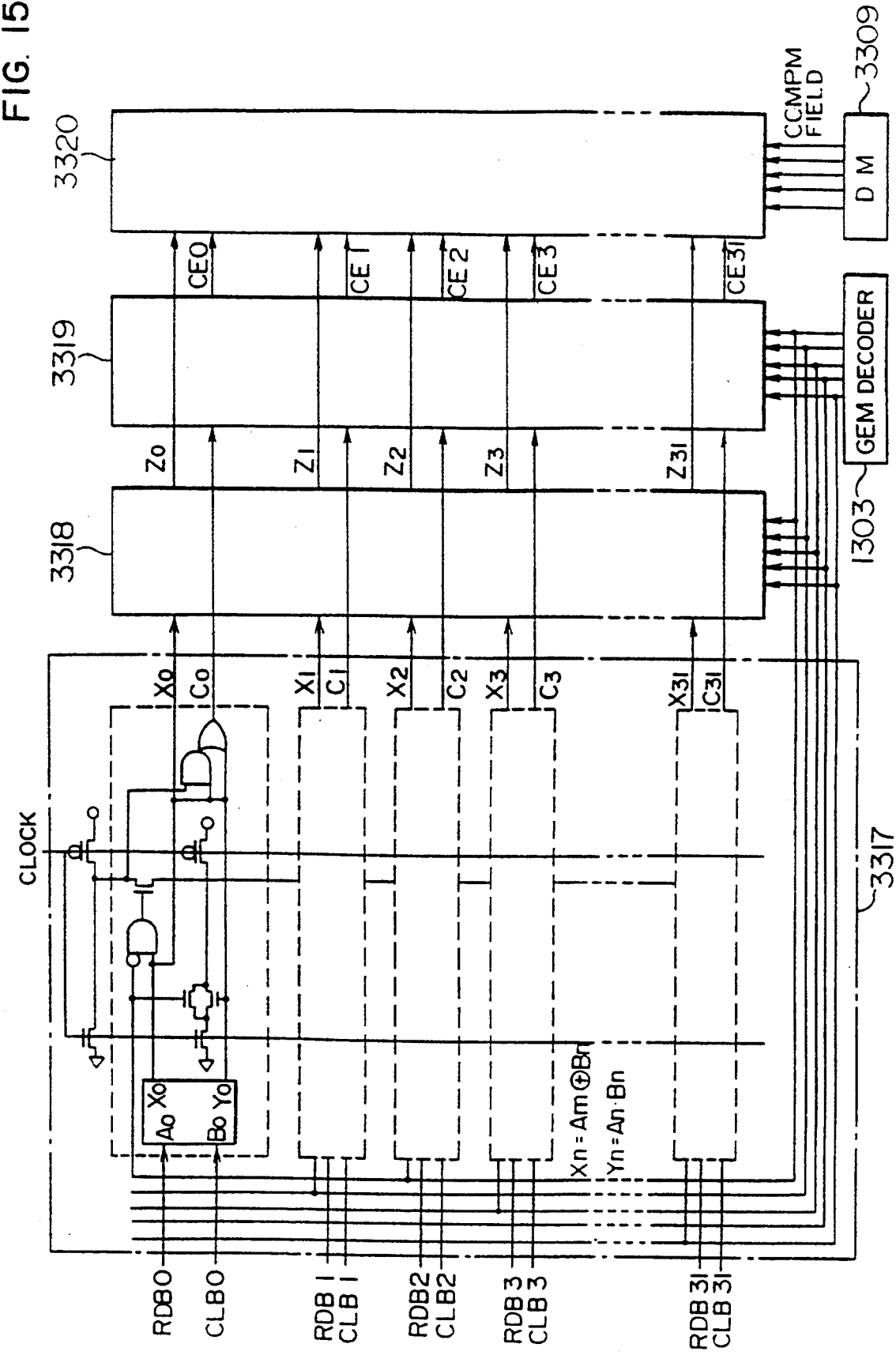
FIG. 15 is a block diagram showing in detail a color comparator.

FIG. 15 shows in detail the color comparator 3317, zero flag expander 3318, carry flag expander 3319 and color comparison mode selector 3320.

The color comparator 3317 is set by the GBM decoder 1303 to any of 32 1-bit comparators, 16 2-bit comparators, eight 4-bit comparators, four 8-bit comparators, or two 16-bit comparators. The zero flag expander 3318 functions to detect matching by receiving the X signal from the color comparator 3317, and it provides the X signal directly for its Z output in the 1 bit/pixel mode in accordance with GBM. It provides a logical product of X0 and X1 for Z0 and Z1 commonly in the 2 bits/pixel mode, as a matching detect signal in 2 bit units. Similarly, it provides the signal in 4 bit units in the 4 bits/pixel mode, in 8 bit units in the 8 bits/pixel mode, and in 16 bit units in the 16 bits/pixel mode.

The carry flag expander 3319 receives the C signal of each bit and outputs it as CE in the 1 bit/pixel mode in accordance with GBM. In the 2 bits/pixel mode, it provides the C1 signal for CE0 and CE1 and the C3 signal for CE2 and CE3, as the carry signal in 2 bit units of the color comparator 3317. It provides the carry signal in 4 bit units of the comparator 3317 in the 4 bits/pixel mode, the carry signal in 8 bit units of the color comparator 3317 in the 8 bits/pixel mode, and the carry signal in 16 bit units of the color comparator 3317 in the 16 bits/pixel mode.

The color comparison mode selector 3320 produces 1 or 0 for each bit in accordance with the condition shown in FIGS. 13A and 13B in response to the signals provided by the zero flag expander 3318 and carry flag expander 3319. Bits which meet the condition of FIGS. 13A and 13B become 1, and bits which do not meet the condition become 0.

Next, the 2-level and multi-level formatting processes for graphic data will be described.

In the graphic data transfer process shown in FIG. 10, when the transfer source coordinate system 41 and drawing coordinate system 42 have different graphic bit modes (GBM), graphic data needs to undergo 2-level and multi-level formatting.

Figure 16:
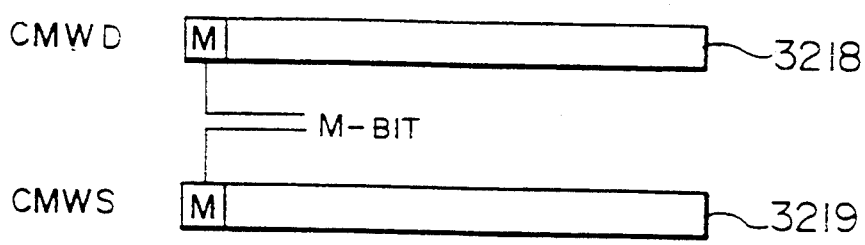
FIG. 16 is a diagram showing a color/monochrome mode selection register.

FIG. 16 shows the CMWS 3219 for storing the memory width of the transfer source coordinate system 41 and the CMWD 3218 for storing the memory width of the drawing coordinate system 42. These registes have their highest-order bits given a special meaning as M bit. Then the M bit is 0, the coordinate system for color data in compliance with GBM of instruction control register 280 is assumed, but when the M bit is 1, the coordinate system for monochrome data (1 bit/pixel) is assumed irrespective of GBM of instruction control register 280. Because of the ability of this embodiment of setting the M bits for the transfer source coordinate system 41 and transfer destination coordinate system 42 independently, if these M bits indicate different modes, 2-level and multi-level formatting are required. Namely, when the CMWD 3218 has a 1's M bit and CMWS 3219 has a 0's M bit, color data needs to be converted to 2-level monochrome data before transfer, and conversely when CMWD 3218 has a 0's M bit and CMWS has a 1's M bit, monochrome data need to be converted to multi-level color data before transfer.

Figure 17:
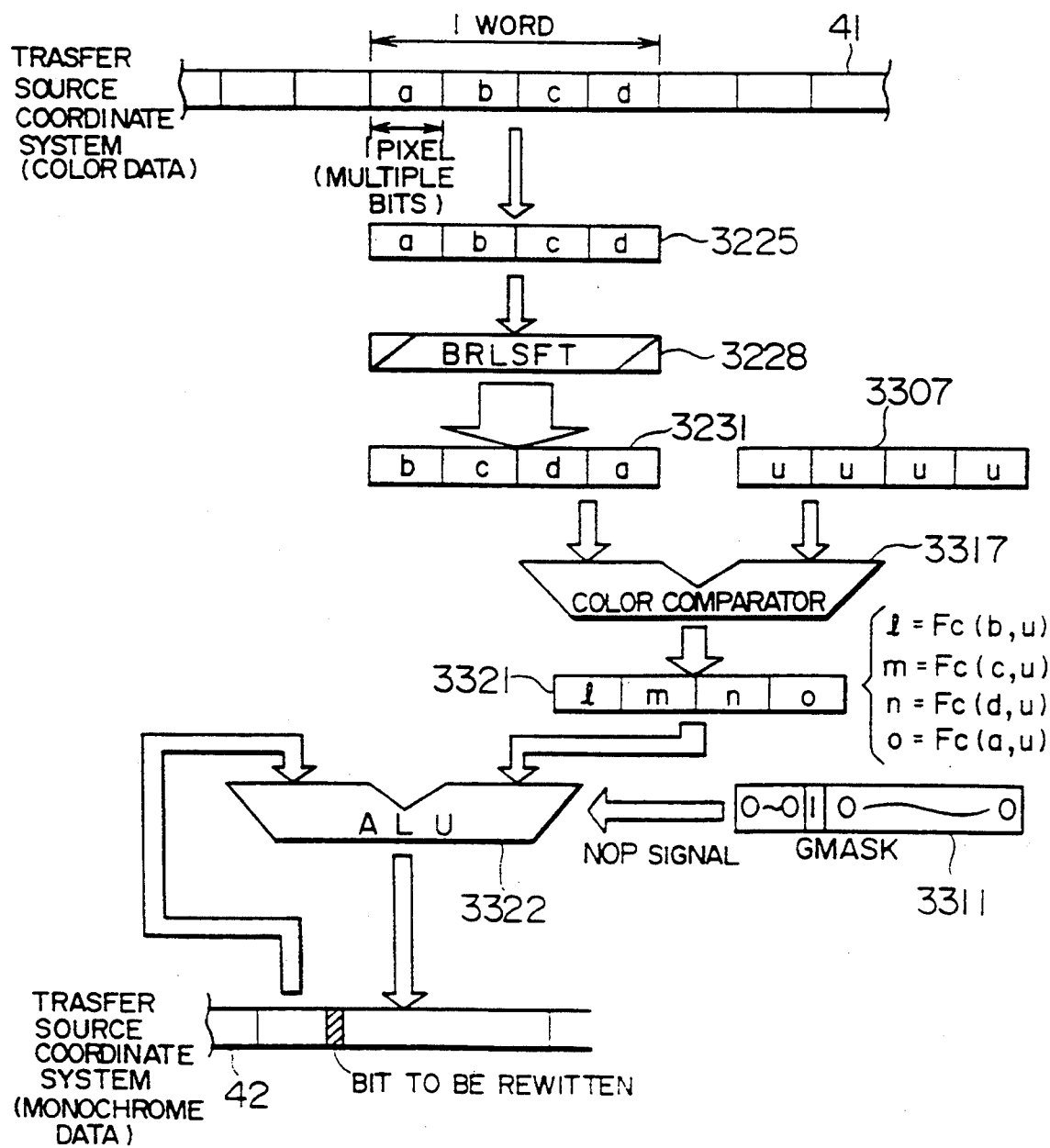
FIG. 17 is a diagram explaining a 2-leveled transfer process.

The 2-level formatting process will be explained first. FIG. 17 is a flowchart showing the 2-level formatting process. Color data is read out of the transfer source coordinate system 41 and set in the register (SLBU) 3225. Next, the data is justified to the bit position of the drawing coordinate system 42 by means of the barrel shifter 3228, and it is set in the register (DLB) 3231. The data set in the register (DLB) 3231 is entered to the color comparator 3317 so that it is compared with data in the color comparison register (CLCMP) 3307, and the comparison result is set in the register (DLC) 3321 in accordance with eight kinds of conditions shown in FIGS. 13A and 13B. A pixel which meets a condition is given "1", while a pixel which does not meet a condition is given "0". As a result, the data is rendered the 2-level format in accordance with one of eight conditions. The 2-level data is set in the ALU 3322 through the bus (CLB) 3301. The ALU 3322 is also supplied with data of the drawing coordinate system 42, and it is operated upon along with the 2-level data. At this time, data from the register (GMASK) 3311 is entered as the NOP signal. In response to the data of register 3311, only a bit at the bit position corresponding to the 1-bit portion to be altered in the drawing coordinate system is made "1", with remaining bits being made "0". Consequently, an arbitrary bit of the drawing coordinate system 42 is rewritten, and data transfer can take place while implementing 2-level formatting.

Figure 18:
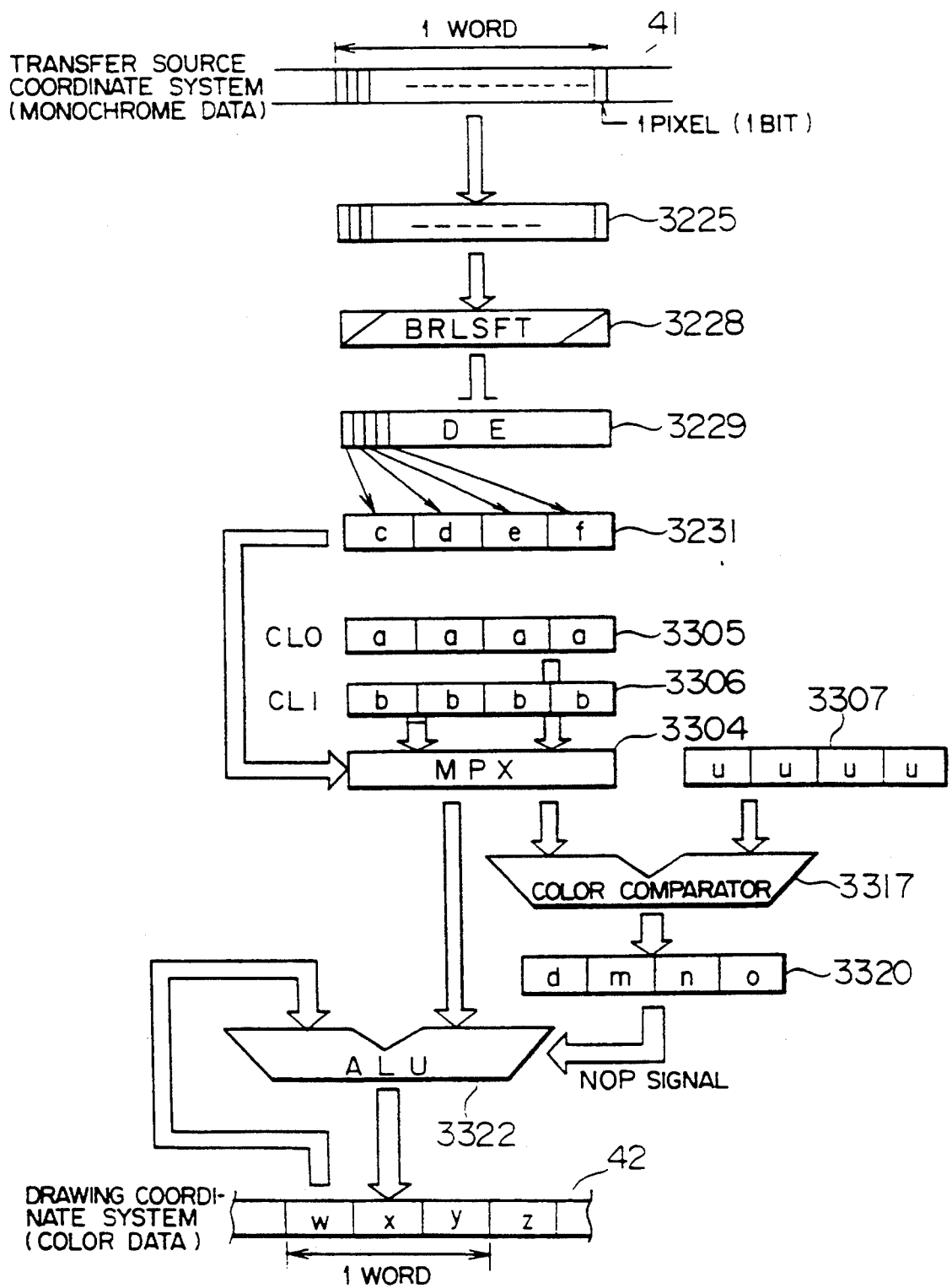
FIG. 18 is a diagram explaining a multi-leveled transfer process.

Next, the multi-level formatting process will be explained. FIG. 18 shows the data stream in the multi-level process. Monochrome data in the transfer source coordinate system 41 is read out and set in the register (SLBU) 3225. Next, the data is justified to the bit position of the drawing coordinate system 42 through the shift operation of the barrel shifter. 3228. The shifted data is then sent to the data expander (DE) 3229. The data expander 3229 has a function of expanding 1-bit data to multiple bits. For example, when the drawing coordinate system 42 is in 8 bits/pixel mode, 1-bit data of the transfer source coordinate system 41 is copied into eight consecutive bits. The expanded data is entered to the multiplexer 3304 by way of the register 3231, and it is used as a signal for selecting the color registers (CL0, CL1) 3305 and 3306. A 1's bit of data in the register 3231 selects data in the color register (CL1) 3306, while 0's bit of data in the register 3231 selects data in the color register (CL0) 3305. As a result, the selected data is a multi-level version of the 1-bit data in the transfer source coordinate system 41. The multi-level data is sent to the color comparator 3317 and ALU 3322, and, after being operated in these blocks, written in the drawing coordinate system 42.

As described above, this embodiment provides the following effectivenesses. Having two coordinate systems, i.e., the transfer source coordinate system 41 and drawing coordinate system 42, enables color data to be and monochrome data independently defined. In transferring data between the two coordinate systems, color data can be transferred fast in word units regardless of the number of bits per pixel. In the case of color data in the transfer source coordinate system 41 and monochrome data in the drawing coordinate system 42, data can be transferred while being subjected to 2-level formatting. Conversely, in case of monochrome data in the transfer source coordinate system 41 and color data in the drawing coordinate system 42, data can be transferred in word units while being subjected to multi-level formatting.

According to this embodiment, as described, a graphic data word including multiple pixels can be transferred at once, thereby accelerating graphic data.

Since the result of comparison of color data with other data can be used as graphic data, it becomes possible to transfer graphic data at high speed while implementing 2-level formatting. Moreover, the ability of expanding black/white graphic data to n bits and selecting other data using it enables high-speed graphic data transfer while implementing multi-level formatting.

Next, another embodiment of this invention will be described.

Figure 19:
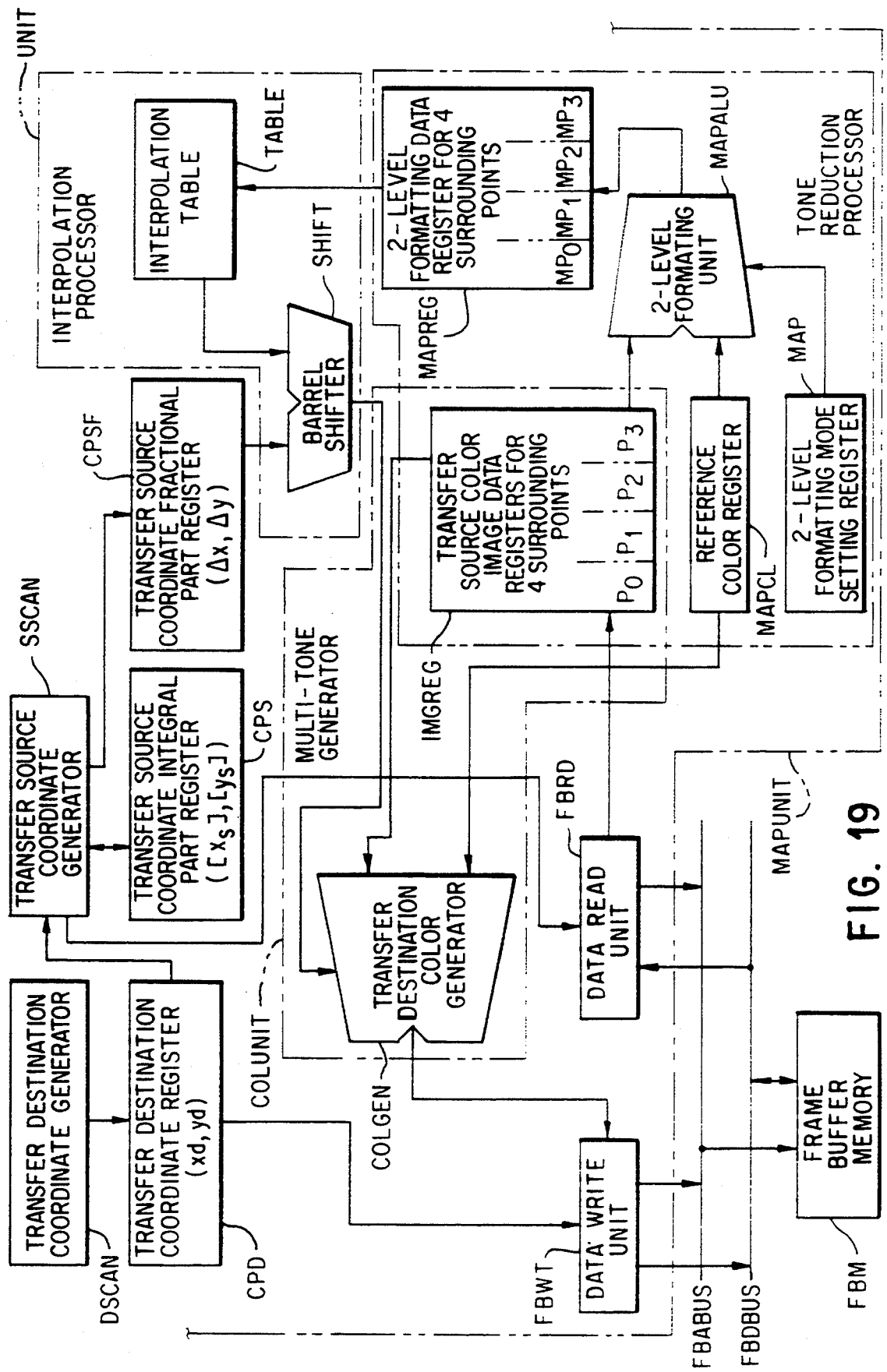
FIG. 19 is a block diagram showing the functions of the computation unit according to another embodiment of the present invention.

FIG. 19 shows in block diagram the major functions of the operation unit in the image processor 10. The unit is the counterpart of the operation unit 30 shown in FIGS. 2 through 6. This embodiment additionally has an interpolation table (TABLE) as compared to the operation unit of FIGS. 2-6, thereby speeding up the interpolation process in enlarging or reducing characters and figures expressed in color data.

FIG. 20 is a block diagram showing the hardware structure of the functional blocks of FIG. 19. The operation unit of this embodiment is a peripheral controller which supports the drawing control function and display control function through a frame buffer memory (FBM) as a bit map memory linked to a frame buffer address bus (FBABUS) and frame buffer data bus (FBDBUS), although the present invention is not confined to this example. The following describes the drawing control functions of the operation unit, with emphasis on the interpolation process for enlarging, reducing and rotating an original color image data representing multi-tone data.

In this embodiment, the original image data is held in a certain area of the frame buffer memory (FBM) and the converted image data produced from the source data is also stored temporarily in a certain area of the frame buffer memory (FBM).

Figure 21:
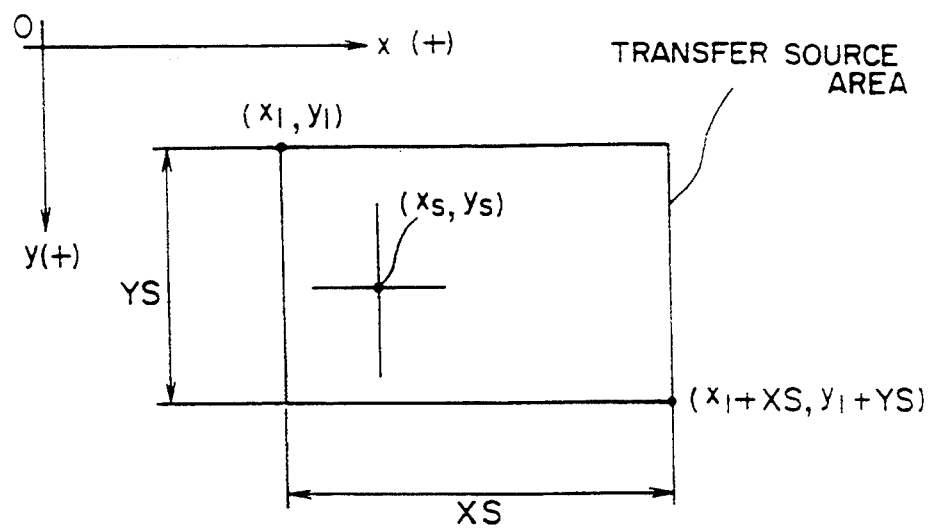
FIG. 21 is a diagram used to explain a definition of a transfer source area.
Figure 22:
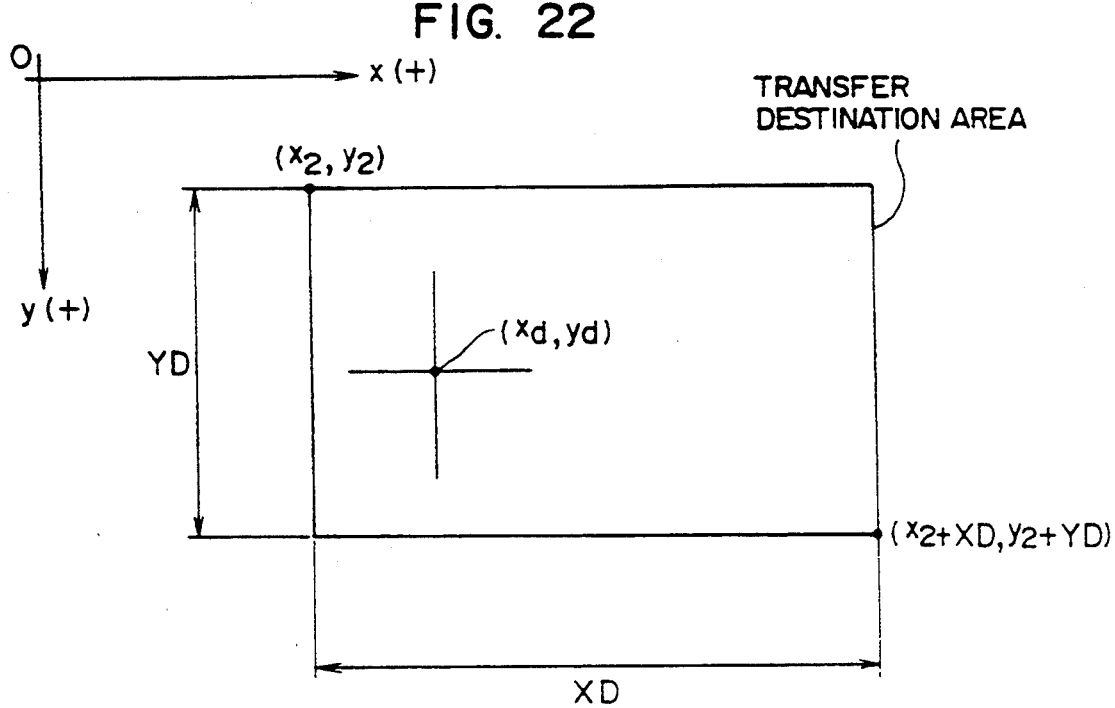
FIG. 22 is a diagram used to explain a definition of a transfer destination area.

The transfer source area which contains the original image data is defined by a start point (x1, y1), end point (x1+XS, y1+YS), horizontal width XS and vertical width YS in a pixel-wise logical address space as shown in FIG. 21. The transfer destination area for storing the converted image data is defined by a start point (x2, y2), end point (x2+XD, y2+YD), horizontal width XD and vertical width YD in a pixel-wise logical address space as shown in FIG. 22. Data for these definitions are included in commands issued by the CPU, although the invention is not confined to this example.

For the interpolation process, the pixel address of the transfer destination area is pointed to so that the area is scanned in the positive x direction and positive y direction from the start point (x2, y2) to the end point (x2+XD, y2+YD). The present invention is not limited to the scanning direction and order of this embodiment.

A coordinate point (xd, yd) shown in FIG. 22 is a scan point corresponding to a certain pixel. The coordinates of the transfer source area corresponding to this scan point (xd, yd) are indicated by point (xs, ys) in FIG. 21. The point (xs, ys) is determined on the basis of the distance from the start point (x2, y2) to the scan point (xd, yd) in the transfer source area and the ratio of the transfer source area to the transfer destination area, in accordance with the enlargement factor or reduction factor of the converted image with respect to the original image. On this account, a coordinate point (xs, ys) in the transfer source area does not necessarily correspond to a pixel position. In such a case, data to be sent to the scan point (xd, yd) is obtained by a interpolation process.

Figure 23A:
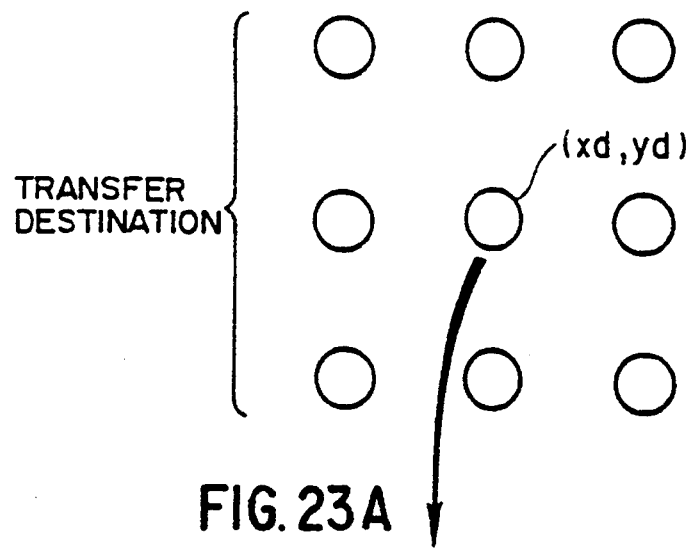
FIG. 23 is a diagram showing a correspondence between the transfer source coordinates and transfer destination coordinates at enlargement and reduction.
Figure 23B:
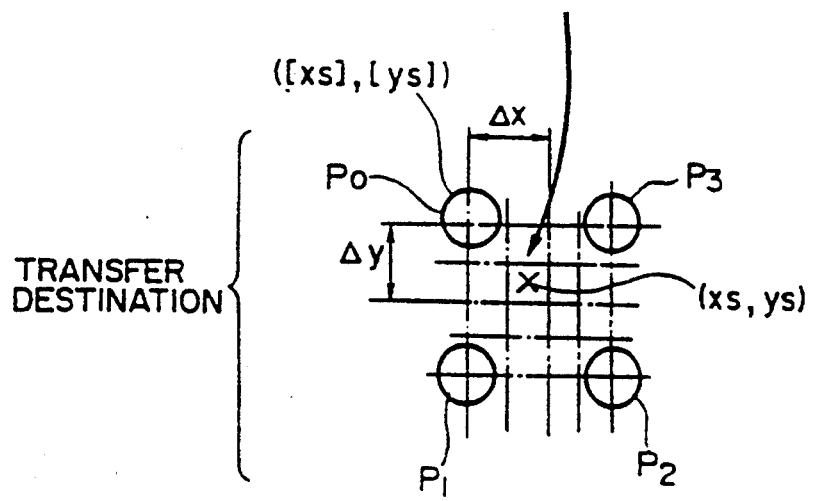

The interpolation process adopted by this embodiment is based on the distance inverse-proportion method, for example, although no confinement is intended. From the viewpoint of principle, when a coordinate point ( xs, ys ) as transfer source coordinates corresponding to a scan point (xd, yd) as transfer destination coordinates is located between pixels shown by symbol "o", in FIG. 23 image information for the coordinate point (xs, ys) is given indirectly in terms of image information of the surrounding four positions P0-P3. In this case, image information for the coordinate point (xs, ys) is determined in terms of the reciprocals of distances from the point (xs, ys) to the four points P0-P3, on the basis of how much influence the image information of P0-P3 has on the coordinate point (xs, ys). The influence of information of P0-P3 on the point (xs, ys) has virtually no relation with the enlargement or reduction factor of the converted image relative to the original image, but it entirely depends on the position of (xs, ys) with respect to the rectangular area defined by the four points P0-P3.

In this embodiment, the rectangular area defined by the four points P0-P3 is partitioned matrix-wise into 16 regions, with the coordinate point (xs, ys) being located in one of them, although no confinement is intended. Depending on the divided region in which the coordinate point (xs, ys) is included, the influence of information of the surrounding four points P0-P3 on the coordinate point (xs, ys) can be distinguished in a resolution of 16. The divided region to which the coordinate point (xs, ys) belongs is given in terms of a fractional distance Δx which represents the distance (xs-[xs]) in x direction between the integral coordinate point ([xs], [ys]) and the adjacent pixel-wise position, and a fractional distance which represents the distance (ys-[ys]) in y direction between the integral coordinate point and the adjacent pixel-wise position. The integral coordinate point ([xs], [ys]) will also be termed "transfer source coordinate integral part" and the fractional distances Ax and Ay will also be termed "transfer source coordinate fractional part" in the following discussion. Although 16 matrix-wise divided regions are assumed for the expedience of explanation, these divided regions are conceived to be equivalent to 16 lattice points.

Since the coordinate point (xs, ys) has its position located in one of 16 small regions inside the rectangular area defined by the surrounding four points P0-P3, the influence of information of the surrounding four points P0-P3 on the coordinate point (xs, ys) is different depending on information which corresponds to the four points P0-P3. This embodiment deals with an original image formed of color image data and its converted image, and information for the surrounding four points P0-P3 is assumed to be provided in 2-level data of the original image for the interpolation process. Accordingly, there are 16 combinations of information corresponding to the surrounding four points P0-P3.

In this embodiment, although no confinement is intended, 16 kinds of interpolation tables (TABLE) for the combinations of 2-level information corresponding to the surrounding four points P0–P3 are prepared in a ROM (read-only memory).

The difference of the inventive color interpolation table from the known monochrome interpolation table will be described on FIG. 24.

The surrounding pixels (P0–P3) in the monochrome interpolation table are part of a monochrome image in active black or inactive white color on the CRT screen, whereas the surrounding pixels in the color interpolation table are part of a color image in red, blue, green or the like. FIG. 24 shows 2-level pixels for calculating the address necessary in reading the 16 kinds of interpolation tables out of the read-only memory. In the monochrome interpolation table, the number appended to small areas specifies black or white, while in the color interpolation table the number appended to small regions specifies the surrounding pixels (P0–P3). The number of divisions to make small regions is not limited to 16.

Figures 25A, 25B, 25C:
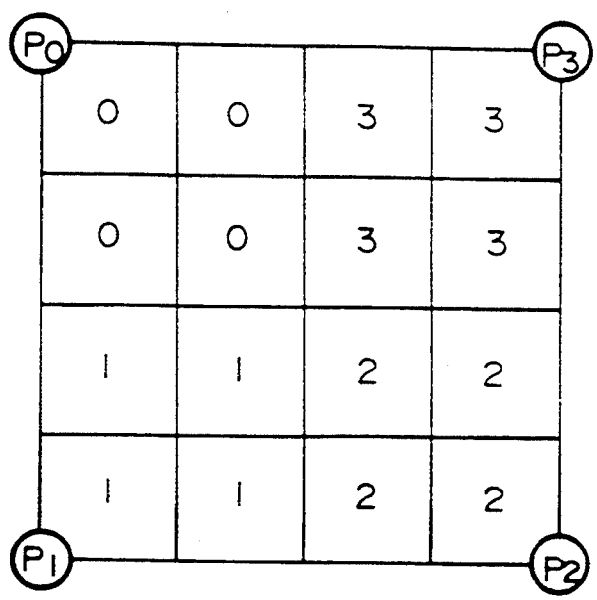
FIGS. 25A to 25C are diagrams showing a manner of storing the interpolation table of FIG. 24 into the read-only memory of FIG. 20.

FIGS. 25A–25C explain how the color interpolation table is stored into the read-only memory. The arrangement of small areas in the interpolation table shown in FIG. 25A is altered as shown in FIG. 25B. The small regions are numbered in binary notation to form 32-bit literal data shown in FIG. 25C. The bit position shown in FIG. 25C is derived from that of the read-only memory. The interpolation table treated as 32-bit literal data is expressed in hexadecimal notation as A5A5F0F0. The interpolation table is thus stored as 32-bit literal data in the read-only memory.

FIG. 26 shows an example of the interpolation table. The surrounding pixels (P0–P3) in the interpolation table are pixels formatted in 2-level form. A white pixel is given a 2-level value of 0, and a black pixel is given a 2-level value of 1. There are 16 kinds of interpolation tables in accordance with combinations of 2-level pixels. The number of surrounding pixels is not limited to 4. It can be extended. The hexadecimal expression in FIG. 26 represents 32-bit literal data stored in the read-only memory, as has been described on FIGS. 25A–25C.

In 16-division matrix regions surrounded by four points P0–P3 in each interpolation table, a region containing number 0 is under influence of image information corresponding to point P0, a region containing number 1 is under influence of image information corresponding to point P1, a region containing number 2 is under influence of image information corresponding to point P3, and a region containing number 3 is under influence of image information corresponding to point P3.

Actually, such a meaning of each divided region is stated by 2-bit data, such as "00" for number 0, "01" for number 1, "10" for number 2, and "11" for number 3, although the present invention is not confined to these representations. Accordingly, each interpolation table having such a conceptual meaning has a form of 32-bit data as shown in FIG. 25C, although no confinement is intended. The bit arrangement is in the order of addressing for the transfer destination area, e.g., from point P0 to point P3, namely from region E0 to region E15, as indicated by the arrow in FIG. 27, although the present invention is not confined to these representations. The assignment of the high-order position of 32-bit data to the region E0 or to the region E15 may be determined arbitrarily.

Next, the system arrangement for producing converted image data from original image data formed of color image data using the foregoing interpolation table (TABLE) will be described mainly in connection with FIG. 19.

In FIG. 19, a transfer destination coordinate generator DSCAN which generates scan coordinate (xd, yd) in the transfer destination area (will be termed simply "transfer destination coordinates"). The transfer destination coordinates (xd, yd) generated by the transfer destination coordinate generator DSCAN are stored in a transfer destination coordinate register CPD.

A transfer source coordinate generator (SSCAN) generates the transfer source coordinates (xs, ys) corresponding to the transfer destination coordinates (xd, yd). The transfer source coordinate generator SSCAN produces the transfer source coordinate integral part ([xs], [ys]) and transfer source coordinate fractional part ($\Delta x$, $\Delta y$) from the transfer source coordinates (xs, ys) as shown in FIG. 26. The transfer source coordinate fractional part ($\Delta x$, $\Delta y$) may be held by being converted into integral data for expedience. The transfer source coordinate integral part ([xs], [ys]) is stored in a transfer source coordinate integral part register CPS, and the transfer source coodinate fractional part ($\Delta x$, $\Delta y$) is stored in a transfer source coordinate fractional part register CPSF.

The transfer source coordinate generator SSCAN calculates the addresses of the pixels in the transfer source area corresponding to the four points P0–P3 surrounding the transfer source coordinate (xs, ys) (see FIGS. 25A–25C) on the basis of the transfer source coordinate integral part ([xs], [ys]) stored in the transfer source coordinate integral part register CPS, and delivers the result to a data read unit FBRD. The data read unit FBRD responds to the supplied address to read out transfer source color image data, i.e., transfer source color image data for the four points P0–P3 surrounding the transfer source coordinates (xs, ys), and stores it in the transfer source color image data register IMGREG.

Arithmetic Logic Unit MAPALU performs 2-level formatting for the transfer source color image data corresponding to the four points P0–P3 stored in the transfer source color image data register IMGREG. The MAPALU implements the 2-level formatting process for the transfer source color image data corresponding to the four points P0–P3 on the basis of comparison with reference data in a reference color register MAPCL, and produces 2-level data MP0, MP1, MP2 and MP3. The computational mode for the 2-level formatting is specified by a 2-level mode setting register MAP.

Any one of eight kinds of 2-level formatting modes can be set in response to 3-bit control data, although the present invention is not limited to this embodiment. These eight operation modes are based on comparing the magnitude of the transfer source color image data [Pi] corresponding to the four points P0–P3 stored in the transfer source color image data register IMGREG with the magnitude of the reference color data [MAPCL] set in the reference color register MAPCL, as shown in FIG. 29.

Image Data 2-level formatting compares the image data [Pi] fetched from the frame buffer memory FBM which is the display memory 40 and the reference color data [MAPCL] set in the reference color register (MAPCL) which is the mapping color register. There are eight kinds of comparing modes, one of which is specified by the control code (output of the mode setting register MAP). For example, map "000" produces a 2-level value of 1 for image data unconditionally. Map "110" produces a 2-level value of 1 or 0 for image data [Pi] depending on whether it is smaller than or greater than the value set in the reference color register, respectively.

MAPREG is a 2-level data register for storing data MP0, MP1, MP2 and MP3 which have been formatted in 2-level form by the 2-level formatting unit MAPALU. The 4-bit 2-level data MP0, MP1, MP2 and MP3 stored in the 2-level data register MAPREG are used as an address signal for selecting one of the 16 kinds of interpolation tables shown in FIG. 26, and it is supplied to the interpolation table TABLE. For example, in case of MP0=0, MP1=1, MP2=0 and MP3=0, the interpolation table No. 2 in FIG. 26 is selected.

The transfer source color image register IMGREG, reference color register MAPCL, 2-level mode setting register MAP, 2-level converting unit MAPALU and 2-level data register MAPREG constitute a tone reduction processor MAPUNIT as an example of a tone reduction processing means which reduces tones of multi-tone data representing the original image.

Figure 27:
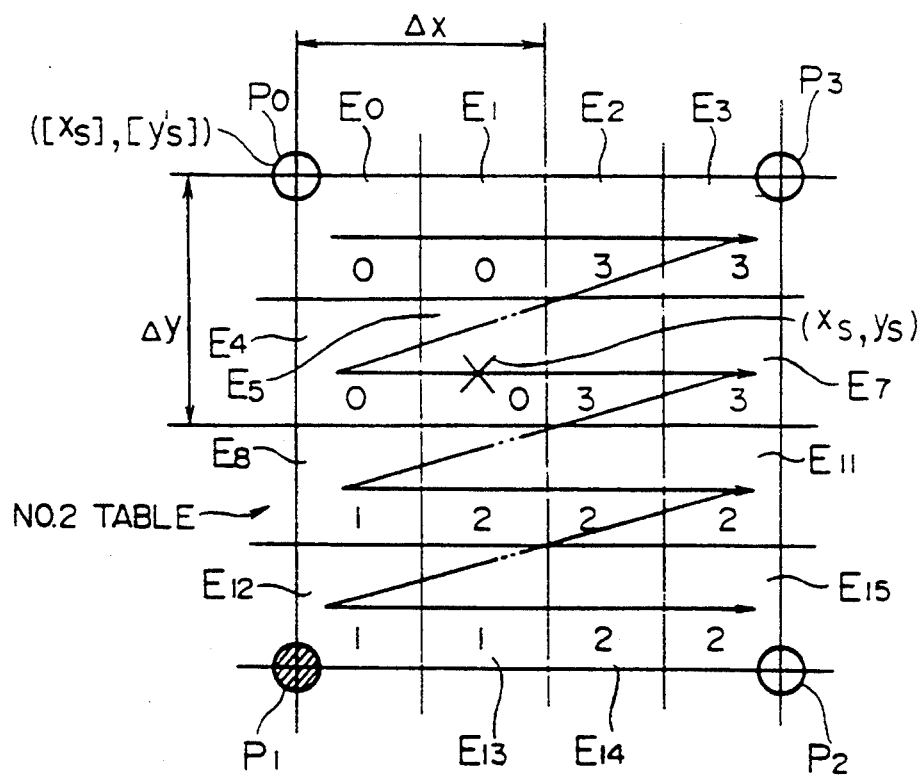
FIG. 27 is a diagram showing the conceptual format of one of the interpolation tables in FIG. 26.
Figure 28:
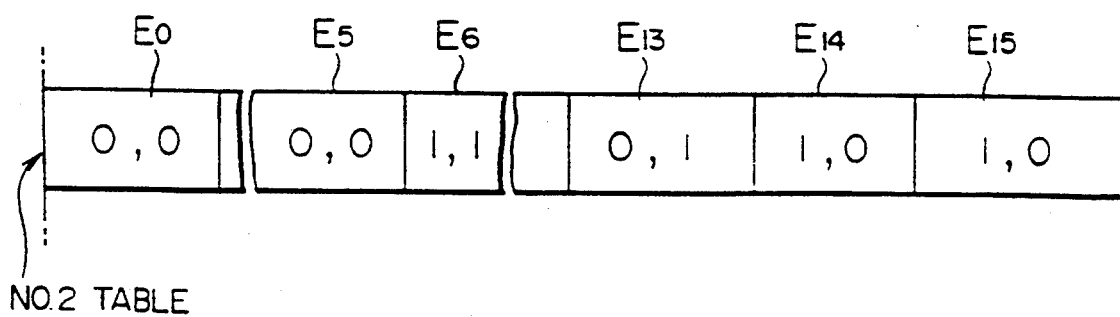
FIG. 28 is a diagram explaining the data pattern of a practical interpolation table corresponding to FIG. 27.

Data from a selected interpolation table, i.e., 32-bit data as shown in FIG. 28, is supplied to the barrel shifter SHIFT. The barrel shifter SHIFT slices 2-bit data included in such a divided region to which the transfer source coordinates (xs, ys) belong as shown in FIGS. 27 and 28, on the basis of the shift value determined by the transfer source coordinate fractional part (Ax, Ay) stored in the transfer source coordinate fractional part register CPSF. For example, when the transfer source coordinates (xs, ys) belong to the divided region E5 as shown in FIG. 27, the interpolation table forming a bit string as shown in FIG. 28 is shifted left by 10 bits, and the 11th and 12th bits "00" in the original contents are read out directly; otherwise control data corresponding to these bits is outputted.

The interpolation table TABLE and barrel shifter SHIFT constitute the interpolation processor IUNIT as an example of an interpolation processing means which implements the interpolation process on the basis of data with its tones being reduced by the tone reduction processing means.

The 2-bit data sliced by the barrel shifter SHIFT or the corresponding control data is supplied to the transfer destination color generator COLGEN. The 2-bit slice data or corresponding control data supplied to the transfer destination color generator COLGEN is used to specify the color to be written in the destination or control data for calculating the color. For example, when the 2-bit slice data is made to be a selection signal for selecting corresponding transfer source color image data from the transfer source color image data register IMGREG, a piece of transfer source color image data corresponding to the 2-bit slice data is selected by a multiplexer (not shown) included in the transfer source color generator COLGEN. For example, in case the 2-bit slice data is "00", as in the preceding explanation, transfer source color image data of the pixel of the corresponding point P0 is selected.

The output of the barrel shifter SHIFT can also be used to initiate a certain microprogram of a microprogram control means (not shown). Namely, it can be used to initiate a microprogram for selecting certain data stored in the transfer source color image data register IMGREG. In this case, the output of the barrel shifter SHIFT may not be supplied directly to the transfer destination color generator COLGEN. It is also possible for the transfer destination color generator COLGEN to perform not only the selection process for certain color image data in the transfer source color image data register IMGREG, but other operations such as color calculation with reference color data in the reference controller register MAPCL for the selected transfer source color image data so that it is modified.

In this manner, the transfer destination color generator COLGEN generates color image data having tones equivalent to the transfer source color image data in accordance with the result of the interpolation process based on the 2-level data.

The transfer destination color generator COLGEN and transfer source color image data register IMGREG constitute a multi-tone generator COLUNIT as an example of a multi-tone generation means which generates converted image data with tones equivalent to the original image data on the basis of the information provided by the interpolation processing means.

The color image data produced by the transfer destination color generator COLGEN is supplied to a data write unit FBWT, which writes the supplied color image data into the transfer destination area in the frame buffer memory FBM in accordance with the address given as the transfer destination coordinates (xd, yd) stored in the transfer destination coordinate register CPD.

Next, the correspondence between the functional blocks shown in FIG. 19 and FIG. 20 will be explained.

The transfer destination coordinate generator DSCAN, transfer source coordinate generator SSCAN and multi-tone generator COLUNIT are formed of an arithmetic logic unit ALU and a set of temporary registers TDR. The data write unit FBWT and data read unit FBRD are formed of a memory address register MAR, read data buffer register RDBR, write data buffer register WDBR, barrel shifter SHIFTER and a set of temporary registers TDR. The transfer destination coordinate register CPD, transfer source coordinate integral register CPS, transfer source coordinate fractional register CPSF, transfer source color image data register IMGREG, 2-level mode setting register MAP and 2-level data register MAPREG are included in the temporary registers TDR. The 2-level formatting unit MAPALU in FIG. 19 corresponds to the comparator COMP in FIG. 20, and the barrel shifter SHIFT in FIG. 19 corresponds to the barrel shifter SHIFTER in FIG. 20. In FIG. 20, the interpolation table TABLE has its address signal supplied through the address register TAR, and has its data read out through the data buffer TDBUF. Further provided in FIG. 20 are a temporary latch TLAT and a shift control register SFTN which stores control data formed on the basis of the transfer source coordinate fractional part.

Although in FIG. 20 the arithmetic logic unit ALU is shared by the transfer destination coordinate generator DSCAN, transfer source coordinate generator SSCAN and multi-tone generator COLUNIT, they may have individual ALUs. The hardware arrangement shown in FIG. 20 operates by being controlled by a microprogram, although no confinement is intended.

Next, the correspondence between FIG. 20 and the operation unit shown in FIGS. 2-6 will be explained. The frame buffer FBM in FIG. 19 corresponds to the display memory in FIG. 1.

In FIG. 20, the buses FBABUS and FBDBUS correspond to the buses AD and DT in FIGS. 1 and 2, and the buses IBUS1, IBUS2 and IBUS3 correspond to the buses UBA, YBA and WBA. The temporary registers TDR correspond to the buffer 3204 and registers 3205–3217, the operation unit ALU corresponds to operation units 3118 and 3227, the 2-level formatting mode setting register MAP corresponds to the drawing mode register 3309, the reference color register MAPCL corresponds to the color comparison register 3307, the comparator COMP corresponds to the color comparator 3317, the temporary latch TLAT corresponds to the destination latch 3321, the barrel shifter SHIFTER corresponds to the barrel shifter 3228, the address register TAR and data buffer TDBUF correspond to the buffer 3204 and registers 3205–3217, the memory address register MAR corresponds to the memory address registers 3332 and 3333, the read data buffer register RDBR corresponds to the data buffer 3325, and the write data buffer register WDBR corresponds to the writing data buffers 3323 and 3324. The comparator COMP in FIG. 20 corresponds to the 2-level formatting unit MAPALU in FIG. 19.

Figure 30A:
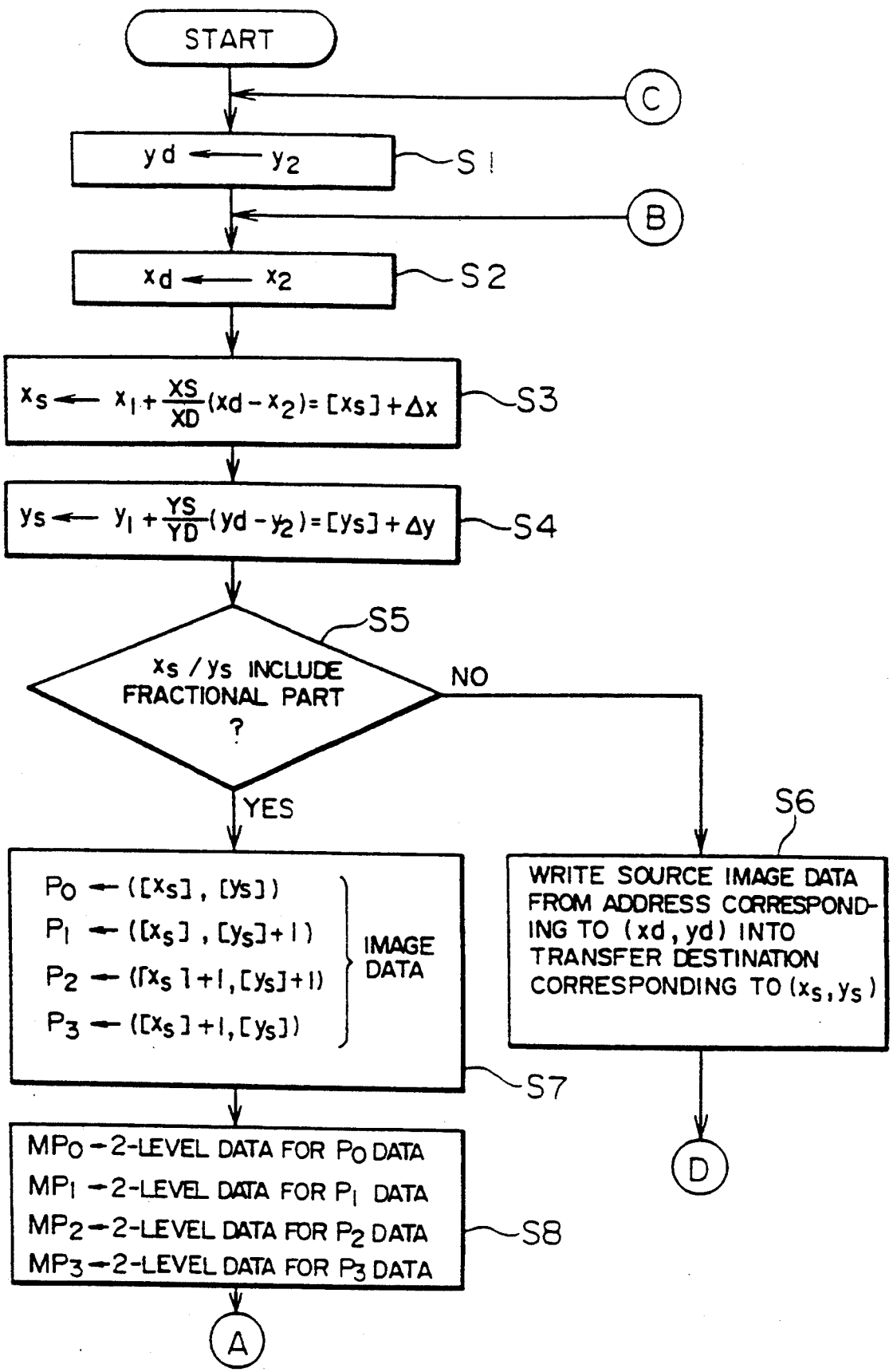
FIGS. 30A and 30B are flowcharts showing an example of the interpolation process.
Figure 30B:
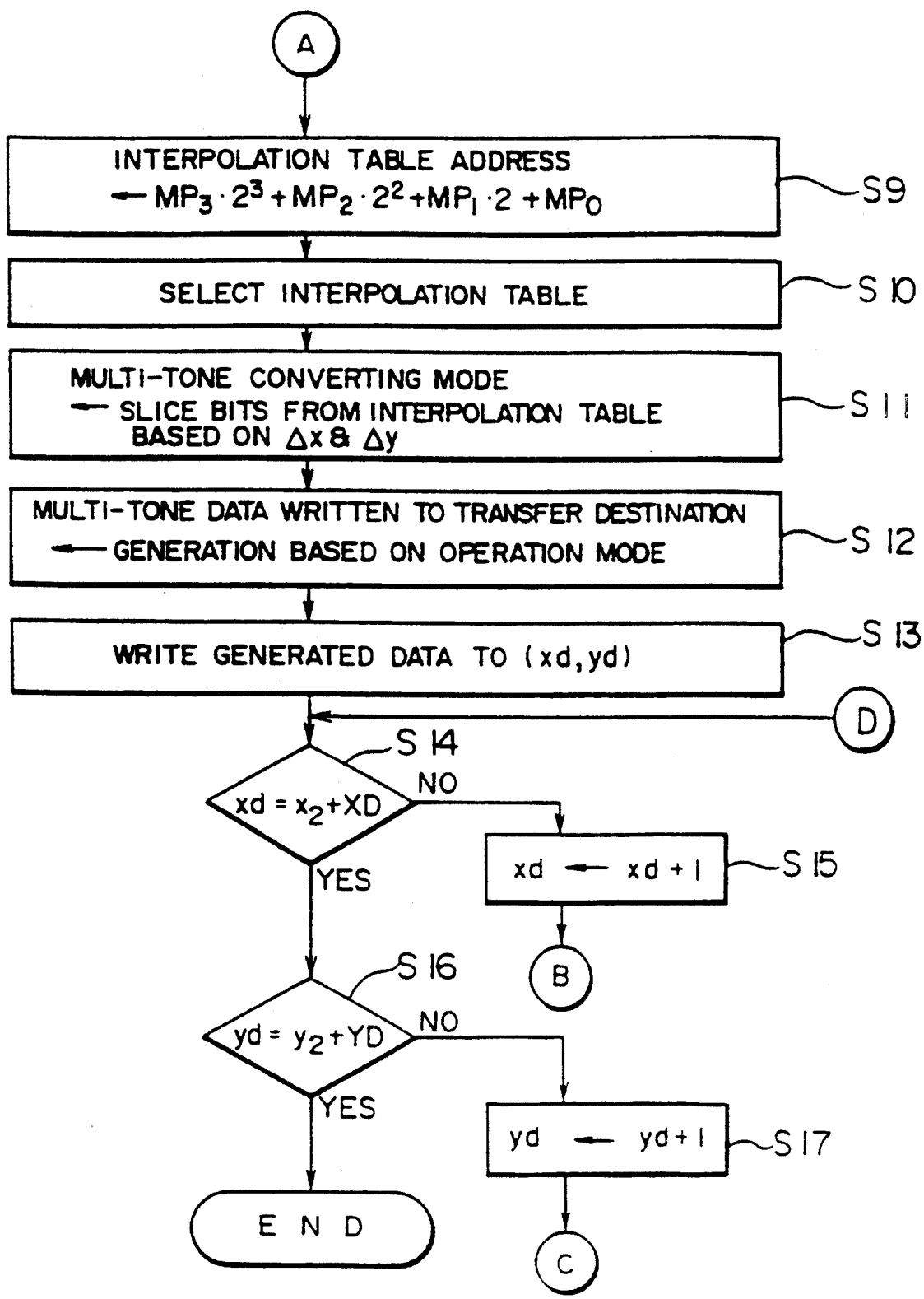

Next, an example of the interpolating operation according to this embodiment will be described with reference to the flowcharts of FIGS. 30A and 30B.

In producing converted image data through the enlargement or reduction of original image data, transfer destination coordinates (xd, yd) are generated as a scan of transfer destination area. Initially, a scanning start point (x2, y2) is set at the transfer destination coordinates (xd, yd). Subsequently, corresponding transfer source coordinate (xs, ys) are generated (steps S3 and S4). A test is conducted as to whether a fractional part is included in the generated transfer source coordinates (xs, ys), i.e., whether or not the transfer source coordinates (xs, ys) coincide with a pixel in the transfer source area (step S5). For example, the transfer source coordinates (xs, ys) immediately after the steps S1 and S2 often coincide with the start point (x1, y1) in the transfer source area. When the transfer source coordinates (xs, ys) coincide with a pixel in the transfer source area, as in this case, the 2-level formatting process and interpolation process are virtually skipped, and a process of reading out color image data corresponding to the transfer source coordinates (xs, ys) from the transfer source area and writing it in the transfer destination area in correspondence to the transfer destination coordinates (xd, yd) by way of the transfer destination color generator COLGEN is executed (step S6).

In another case where the transfer source coordinates (xs, ys) do not coincide with a pixel in the transfer source area, color image data corresponding to the four points P0–P3 around the transfer source coordinates (xs, ys) are read out of the transfer source area into the transfer source color image data register IMGREG on the basis of the transfer source coordinate integral part ([xs], [ys]) generated in steps S3 and S4 (step S7). The readout color image data are formatted into 2-level data MP0–MP3 by the 2-level formatting unit MAPALU (step S8). The formatted 2-level data MP0–MP3 are made to be address data for accessing the interpolation table TABLE (step S9), and one of 16 kinds of interpolation tables is selected (step S10). The expression shown in step S9 is different from the form of actual address data, and it is an expression for evaluating a number corresponding to the interpolation table number.

After an interpolation table has been selected, corresponding bits on the interpolation table are sliced by the barrel shifter SHIFT on the basis of the transfer source coordinate fractional part $\Delta x$ and $\Delta y$ generated in steps S3 and S4, and the operation for multiple tones comparable with the original image is specified in the transfer destination color generator COLGEN (step S11). In response to this specification, the transfer destination color generator COLGEN generates color image data having tones comparable with the transfer source color image data in accordance with the result of interpolation based on the 2-level data (step S12).

The color image data generated by the transfer destination color generator COLGEN is written to the transfer destination area in the frame buffer memory FBM in accordance with the address given as the transfer destination coordinates (xd, yd) (step S13).

After color image data has been written in a certain transfer destination coordinates (xd, yd) in steps S6 and S13, test is conducted as to whether a data transfer element is left, i.e., whether the scanning of transfer destination coordinates (xd, yd) has reached the end point (x2+XD, y2+YD), and the next operation is determined. Namely, test is conducted as to whether xd coincides with x2+XD (step S14) and, if they do not match, the previous value xd is incremented by one to advance the horizontal main scanning by one (step S15), and the sequence returns to step S3. In case of a coincidence result in step S14, test is conducted as to whether yd coincides with YD: (step S16). If the step S16 provides a conflicting test result, the previous value yd is incremented by one to advance the vertical subservient scanning by one (step S17), and the sequence returns to step S2. A coincidence result of step S17 signifies the arrival of scanning for the transfer destination coordinates (xd, yd) at the end point (x2+XD, y2+YD), and the drawing operation is terminated.

The reference color register described above sets a color for the interpolation of a color image. For example, in enlarging an image of a character in a specific color on the background of a different color, the character is interpolated by specifying its color in the reference color register and specifying "001" for the map. In this manner, a color for interpolation can be selected arbitrarily by means of the reference color register and mode setting register MAP.

Although the embodiment has been explained for an example of color information as a pixel expressed using multiple bits, it may be tone information or the mixture of color information and tone information.

The foregoing embodiment provides the following advantages.

(1) The provision of the means of formatting 2-level data from multi-level color image data converts original color image data into 2-level monochrome image data before the interpolation process, allows the application of the interpolation process for monochrome image data which is simple and has fewer operation steps to original color image data. p0 (2) The provision of the means of restoring multi-tone data, such as color image data, from the result of interpolation process for monochrome image data allows enlargement and reduction of original image data without imposing reduced tones of the original image, while implementing the interpolation process in monochrome image mode concurrently.

(3) Owing to the above advantages, providing the 2-level formatting unit and the unit for restoring or generating multi-tone data such as color image data realizes the interpolation process, which is simple and has less operation steps, for multi-tone data.

(4) Providing of the interpolation table, in advance, for the interpolation process achieves fast computation process.

(5) In case the interpolation table contains a set of data by which multi-tone data can be determined relatively as converted image data on the basis of the intra-pixel position in the original image data storing area obtained in correspondence to a certain pixel the positions of a certain number of pixels surrounding the intra-pixel position, multi-tone data based on the result of 2-level formatting can be generated extremely efficiently.

(6) Execution of the interpolation process for multi-level data such as a color image prevents the deterioration of image quality due to overlapping pixels caused by enlargement or reduction or missing pixels caused by rotation of multi-level data such as a color image.

The above embodiment is merely an example, and it is of course possible to make various modifications without departing from the essence of the present invention.

For example, the data pattern in the interpolation table described in the above embodiment can be varied depending on the type of interpolation process. To make such modification easier, the table may be stored in a rewritable memory means represented by RAM (random access memory).

Although in the foregoing embodiment each interpolation table is divided into 16 regions because of the fractional part having a unit of ¼ inter-pixel distance, the number of divisions can be varied depending on the unit of the fractional part. Although in the above embodiment 16 kinds of interpolation tables are used with the intention of interpolation based on four points surrounding the transfer destination coordinates which do not coincide with a pixel, the number of kinds of interpolation tables varies depending on the number of surrounding reference points, which is not confined to four as in the above embodiment.

The interpolation process is not confined to the scheme of using interpolation tables, at a cost of reduced processing speed.

Although in the above embodiment 2-level formatting has been explained as an example of means for reducing tones, other means for reducing tones of original image data, such as 4-level formatting or 8-level formatting, can also be adopted.

Although the above embodiment has been explained for the example of enlargement and reduction, the interpolation technique used for enlargement and reduction can equally be applied to the algorithm of rotation of graphic figures.

Although the invention has been described for the application to an image processor, it can be applied extensively to various other data processors having drawing functions such as enlargement, reduction, rotation, etc. This invention is applicable to circumstances of producing converted image data from original image data through at least an interpolation process.

We claim:

1. A graphic data processing system for producing converted image data from source image data, each of said source image data having a color, comprising:

first means for determining, for each of said source image data, whether a color of a particular one of said source image data is a predetermined color;

means for determining interpolation data based on a conversion factor;

second means for determining a color of each of said interpolation data based on the results of the determination made by said first means with respect to a plurality of said source image data disposed at a predetermined positional relation to said particular one of said source image data, said second means including a plurality of interpolation tables containing data for determining color of data to be interpolated;

means for generating said interpolation data each having a color determined by said second means, whereby said converted image data is generated which includes said interpolation data; and means for writing said generated converted image data in a frame buffer memory by adjusting data stored in said frame buffer memory in response to said generated converted image data.

2. A graphic data processing system according to claim 1, wherein said interpolation tables contain an interpolation process in a patterned table form.

3. A graphic data processing system according to claim 2, wherein said interpolation tables contain, in the patterned table form, data for determining color of data to be interpolated as said converted image data on the basis of a pixel data position in a source image data storing area, wherein said converted image data is stored in said interpolation tables, corresponding to a predetermined pixel, and of a predetermined number of pixel data positions surrounding the source image data position.

4. A graphic data processing system according to claim 1, wherein said source image data represents each pixel by at least two bits and wherein said first means comprises a color comparator which converts said source image data into one bit per pixel data by comparing color data of said source image data with predetermined color data and providing a one bit result of the comparing.

5. A graphic data processing system according to claim 4, wherein said second means includes a plurality of interpolation tables which contain an interpolation process in a patterned table form.

6. A graphic data processing system according to claim 5, wherein said interpolation tables contain, in the patterned table form, data for determining color of data to be interpolated as converted image data on the basis of a pixel data position in a source image data storing area, wherein converted image data is stored in said interpolation tables, corresponding to a predetermined pixel, and of a predetermined number of pixel data positions surrounding the source image data position.

7. A graphic data processing system according to claim 1, wherein said first means comprises a comparator.

8. A graphic data processing system according to claim 1, wherein color of data to be interpolated is directly determined from said interpolation table.

9. A graphic data processing system for producing converted image data from source image data, each of said source image data having a color, said graphic data processing system comprising a central processing unit and a graphic processor, said central processing unit and said graphic processor together comprising:

first means for determining, for each of said source image data, whether a color of a particular one of said source image data is a predetermined color;

means for determining interpolation data based on a conversion factor;

second means for determining a color of each of said interpolation data based on the results of the determination made by said first means with respect to a plurality of said source image data disposed at a predetermined positional relation to said particular one of said source image data, said second means including a plurality of interpolation tables containing data for determining color of data to be interpolated;

means for generating said interpolation data each having a color determined by said second means, whereby said converted image data is generated which includes said interpolation data; and means for writing said generated converted image data in a frame buffer memory by adjusting data stored in said frame buffer memory in response to said generated converted image data.

10. A graphic data processing system according to claim 9, wherein said interpolation tables contain an interpolation process in a patterned table form.

11. A graphic data processing system according to claim 10, wherein said interpolation tables contain, in the patterned table form, data for determining color of data to be interpolated as said converted image data on the basis of a pixel data position in a source image data storing area, wherein said converted image data is stored in said interpolation tables, corresponding to a predetermined pixel, and of a predetermined number of pixel data positions surrounding the source image data position.

12. A graphic data processing system according to claim 9, wherein said source image data represents each pixel by at least two bits and wherein said first means comprises a color comparator which converts said source image data into one bit per pixel data by comparing color data of said source image data with predetermined color data and providing a one bit result of the comparing.

13. A graphic data processing system according to claim 12, wherein said second means includes a plurality of interpolation tables which contain an interpolation process in a patterned table form.

14. A graphic data processing system according to claim 12, wherein said interpolation tables contain, in the patterned table form, data for determining color of data to be interpolated as converted image data on the basis of a pixel data position in a source image data storing area, wherein converted image data is stored in said interpolation tables, corresponding to a predetermined pixel, and of a predetermined number of pixel data positions surrounding the source image data position.

15. A graphic data processing system according to claim 9, wherein said first means comprises a comparator.

16. A graphic data processing system according to claim 9, wherein color of data to be interpolated is directly determined from said interpolation table.

17. A graphic data processing system according to claim 9, said graphic data processing system further comprising a system memory storing information processed by said central processing unit, wherein a portion of said system memory includes said frame buffer memory.

18. A graphic data processing system according to claim 17, wherein said interpolation tables contain an interpolation process in a patterned table form.

19. A graphic data processing system according to claim 17, wherein said interpolation tables contain, in the patterned table form, data for determining color of data to be interpolated as said converted image data on the basis of a pixel data position in a source image data storing area, wherein said converted image data is stored in said interpolation tables, corresponding to a predetermined pixel, and of a predetermined number of pixel data positions surrounding the source image data position.

20. A graphic data processing system according to claim 17, wherein said source image data represents each pixel by at least two bits and wherein said first means comprises a color comparator which converts said source image data into one bit per pixel data by comparing color data of said source image data with predetermined color data and providing a one bit result of the comparing.

21. A graphic data processing system according to claim 20, wherein said second means includes a plurality of interpolation tables which contain an interpolation process in a patterned table form.

22. A graphic data processing system according to claim 20, wherein said interpolation tables contain, in the patterned table form, data for determining color of data to be interpolated as converted image data on the basis of a pixel data position in a source image data storing area, wherein converted image data is stored in said interpolation tables, corresponding to a predetermined pixel, and of a predetermined number of pixel data positions surrounding the source image data position.

23. A graphic data processing system according to claim 17, wherein said first means comprises a comparator.

24. A graphic data processing system according to claim 17, wherein color of data to be interpolated is directly determined from said interpolation table.

25. A graphic data processing system according to claim 17, wherein said information stored in said system memory includes at least one of instructions, commands, data and programs processed by said central processing unit.

26. A graphic data processing system for producing converted image data from source image data, each of said source image data having a color, said graphic data processing system comprising:

a central processing unit; and a graphic processor, said graphic processor comprising:

first means for determining, for each of said source image data, whether a color of a particular one of said source image data is a predetermined color;

means for determining interpolation data based on a conversion factor;

second means for determining a color of each of said interpolation data based on the results of the determination made by said first means with respect to a plurality of said source image data disposed at a predetermined positional relation to said particular one of said source image data, said second means including a plurality of interpolation tables containing data for determining color of data to be interpolated;

means for generating said interpolation data each having a color determined by said second means, whereby said converted image data is generated which includes said interpolation data; and means for writing said generated converted image data in a frame buffer memory by adjusting data stored in said frame buffer memory in response to said generated converted image data.

27. A graphic data processing system according to claim 26, said graphic data processing system further comprising a system memory storing information processed by said central processing unit, wherein a portion of said system memory includes said frame buffer memory.

28. A graphic data processing system according to claim 27, wherein said interpolation tables contain an interpolation process in a patterned table form.

29. A graphic data processing system according to claim 27, wherein said interpolation tables contain, in the patterned table form, data for determining color of data to be interpolated as said converted image data on the basis of a pixel data position in a source image data storing area, wherein said converted image data is stored in said interpolation tables, corresponding to a predetermined pixel, and of a predetermined number of pixel data positions surrounding the source image data position.

30. A graphic data processing system according to claim 27, wherein said source image data represents each pixel by at least two bits and wherein said first means comprises a color comparator which converts said source image data into one bit per pixel data by comparing color data of said source image data with predetermined color data and providing a one bit result of the comparing.

31. A graphic data processing system according to claim 30, wherein said second means includes a plurality of interpolation tables which contain an interpolation process in a patterned table form.

32. A graphic data processing system according to claim 30, wherein said interpolation tables contain, in the patterned table form, data for determining color of data to be interpolated as converted image data on the basis of a pixel data position in a source image data storing area, wherein converted image data is stored in said interpolation tables, corresponding to a predetermined pixel, and of a predetermined number of pixel data positions surrounding the source image data position.

33. A graphic data processing system according to claim 27, wherein said first means comprises a comparator.

34. A graphic data processing system according to claim 27, wherein color of data to be interpolated is directly determined from said interpolation table.

35. A graphic data processing system according to claim 27, wherein said information stored in said system memory includes at least one of instructions, commands, data and programs processed by said central processing unit.

* * * * *

UNITED STATES PATENT AND TRADEMARK OFFICE
CERTIFICATE OF CORRECTION

PATENT NO. : 5,448,689

DATED : September 5, 1995

INVENTOR(S) : Shigeru Matsuo et al

It is certified that error appears in the above-indentified patent and that said Letters Patent is hereby corrected as shown below:

| Column | Line | |
|--------|------|---|
| 1 | 7  | Change "544,503" to --07/544,503--. |
| 1 | 21 | After "circuits" insert --,--. |
| 1 | 36 | Change "aa" to --a--. |
| 1 | 61 | Change "shown" to --known--. |
| 2 | 4  | After "Further" insert --,--. |
| 2 | 35 | Delete "the"; after "of a" insert --pixel-- |
| 2 | 39 | Delete "which". |
| 2 | 56 | Delete "addition". |
| 3 | 25 | Before "divisions" delete "a". |
| 3 | 32 | Change "coordinate" to --coordinates--. |
| 3 | 56 | Delete "in both". |

UNITED STATES PATENT AND TRADEMARK OFFICE
CERTIFICATE OF CORRECTION

PATENT NO. : 5,448,689
DATED : September 5, 1995
INVENTOR(S) : Shigeru Matsuo et al It is certified that error appears in the above-indentified patent and that said Letters Patent is hereby corrected as shown below:

| Column | Line | |
|---|---|---|
| 5 | 55 | Before "a first" delete "an". |
| 7 | 7 | Change "the logical" to --a logical microprogram--. |
| 7 | 29 | After "micro-program" insert --memory--. |
| 7 | 31 | Change "a" to --into--. |
| 7 | 35 | After "memory" insert --40--. |
| 7 | 44 | Delete "control". |
| 7 | 45 | After "instruction" insert --control--. |
| 8 | 4 | Change "FIG." to --FIGS.--. |
| 8 | 39 | Change "42 the data," to --42, the data is--. |

UNITED STATES PATENT AND TRADEMARK OFFICE
CERTIFICATE OF CORRECTION

PATENT NO. : 5,448,689

DATED : September 5, 1995

INVENTOR(S) : Shigeru Matsuo et al

It is certified that error appears in the above-indentified patent and that said Letters Patent is hereby corrected as shown below:

| Column | Line | |
|---|---|---|
| 8 | 64 | Delete "the" (second occurrence). |
| 9 | 1 | Change "processings" to --processing--. |
| 9 | 2 | Delete "an". |
| 10 | 43 | After "shifter" delete ".". |
| 10 | 64 | Delete "to be". |
| 10 | 65 | After "data" insert --to be--. |
| 11 | 40 | Change "reducting" to --reducing--. |
| 12 | 19 | After "23" insert --,--. |
| 12 | 50 | Change "Ax and Ay" to --$\Delta x$ and $\Delta y$--. |
| 13 | 51 | Change "P3" to --P2--. |

UNITED STATES PATENT AND TRADEMARK OFFICE
CERTIFICATE OF CORRECTION

PATENT NO. : 5,448,689
DATED : September 5, 1995
INVENTOR(S) : Shigeru Matsuo et al It is certified that error appears in the above-indentified patent and that said Letters Patent is hereby corrected as shown below:

| Column | Line | |
|--------|------|---|
| 14 | 8 | Change "(will" to --will--. |
| 14 | 9 | Change "coordinates")." to --coordinates".-- |
| 14 | 63 | Change "Data" to --data--. |
| 18 | 59 | Delete "p0 (2)". |
| 18 | 60 | Before "The" insert --(2)--. |
| 19 | 4 | Delete "of". |
| 19 | 11 | After "pixel" insert --and--. |

Signed and Sealed this

Fifth Day of March, 1996

*Attest:*

BRUCE LEHMAN

*Attesting Officer*     *Commissioner of Patents and Trademarks*